(12) United States Patent
Reohr, III

(10) Patent No.: US 7,330,806 B2
(45) Date of Patent: Feb. 12, 2008

(54) VIRTUALIZED NETWORK

(76) Inventor: John Reohr, III, Box 210, Swarthmore, PA (US) 19081-0210

( * ) Notice: Subject to any disclaimer, the term of this patent is extended or adjusted under 35 U.S.C. 154(b) by 778 days.

(21) Appl. No.: 09/923,736

(22) Filed: Aug. 7, 2001

(65) Prior Publication Data

US 2002/0059356 A1    May 16, 2002

Related U.S. Application Data

(60) Provisional application No. 60/223,792, filed on Aug. 8, 2000.

(51) Int. Cl.
G06F 7/48 (2006.01)
(52) U.S. Cl. .......................................................... 703/6
(58) Field of Classification Search ................ 709/204, 709/205, 223; 345/703, 473; 715/706, 757; 703/6
See application file for complete search history.

(56) References Cited

U.S. PATENT DOCUMENTS

| | | | | |
|---|---|---|---|---|
| 5,533,180 A | * | 7/1996 | Zhou et al. ................. | 715/542 |
| 5,652,871 A | * | 7/1997 | Steinman et al. ............... | 703/6 |
| 5,926,179 A | * | 7/1999 | Matsuda et al. ............ | 715/752 |
| 6,005,548 A | * | 12/1999 | Latypov et al. ............. | 345/156 |
| 6,298,374 B1 | * | 10/2001 | Sasaki et al. ................ | 709/204 |
| 2001/0037316 A1 | * | 11/2001 | Shiloh .......................... | 705/74 |
| 2003/0080989 A1 | * | 5/2003 | Matsuda et al. ............ | 345/706 |

OTHER PUBLICATIONS

Search results from Copyright, Register Works Database, (Nov. 22, 2005 Date of Search).*
Deposited work registered in the U.S. Copyright Office, No. TXu 790-574, entitled "A Virtualized Network," (1986-1996).

* cited by examiner

Primary Examiner—Larry D. Donaghue
(74) Attorney, Agent, or Firm—Harrity Snyder, LLP

(57) ABSTRACT

A virtualized network that provides real-to-virtual correspondence without technically designed artificial systems of any kind. The virtualized network includes a plurality of virtualized entities (VENTs), each VENT a program together with its corresponding real entity contained in the real world and exactly mimicking the action of its real entity counterpart. All hardware and software devices, as well as people can be virtualized in the virtualized network. Once virtualized, persons and devices (real world entities) are able to communicate immediately and directly.

14 Claims, 16 Drawing Sheets

ILLUSTRATION FOR VENT TABLE ON BANK'S SP MACHINE

| VENT NAME | PERSON/ DEVICE | CONNECT/ NOT CON | ON/ OFF | SPLN SPACE | DEFAULT SPLN | VSPACE ADDRESS |
|---|---|---|---|---|---|---|
| OTIN | | | | MEMORY | | |
| PORT 1 | | C | | OTIN | | |
| PORT 3 | | C | | OTIN | | |
| CTLR 1 | | C | | PORT 3 | | |
| CTLR 2 | | C | | PORT 3 | | |
| CTLR 6 | | C | | PORT 1 | | |
| BETH | P | | | | | |
| MODM 1 | | C | | CTLR 6 | | |
| S390 | | | | FONE 5,6,N | | |
| FONE 5 | | | | MODM | | |
| FONE 6 | | | | MODM | | |
| PRNT B | | C | | CTLR 2 | PRINT B | |
| MODM 2 | | C | | CTLR 6 | | |
| TERM 1 | | | | FONE 1 | | |
| CICS | | | | S390 | | |
| TERM R | | C | | CICS | | |
| TERMT | | | | CICS | | |
| DRIL 7 | | | | CTLR 2 | | |
| HANK | P | | | | | |
| NODEMNGR | P | | | | | |
| CTLR 7 | | C | | PORT 1 | | |
| DISK B | | C | | CTLR 7 | | |
| PETE | P | | | TERMT | | |
| FONE 1 | | | | MODM | | |

WHEN A CONNECTED DEVICE IS ON, IT IS BUSY/USED. WHEN A PUBLIC DEVICE IS ON, IT ANSWERED "AVAILABLE" TO BE USED.

FIG. 3-5

| ORIGINAL SPEAKING PROGRAM | VIRTUAL COMPONENT SPEAKS | DIRECTION OF BIT STRING MOVEMENT | PHYSICAL COMPONENT SPEAKS |
|---|---|---|---|
| OTIN OTIN | SELECTPORT 3 | ↑↓ | PORT 3 SELECTED |
| CTLR CTLR | RESET | ↑↓ | RESET OK |
| CTLR CTLR | SEL. LINE # (PRINT B) | ↑↓ | LINE # SELECTED |
| PRNT B PRNT B | SKIP NEW PAGE | ↑↓ | NEW PAGE OK |
| BETH BETH | BETH/ HOW??/HANK | ↑↓ | LINE PRINTED OK |

THESE ARE PAKTs (THE DATA AND ACTION) PASSING BETWEEN THE VIRTUAL AND PHYSICAL WORLDS @ OTIN ENTITY

AT THIS POINT BETH MAY CONTINUE TO SPEAK PAKTs TO HER "SPEAK-LISTEN SPACE", IE. PRNT B.

FIG. 3-7

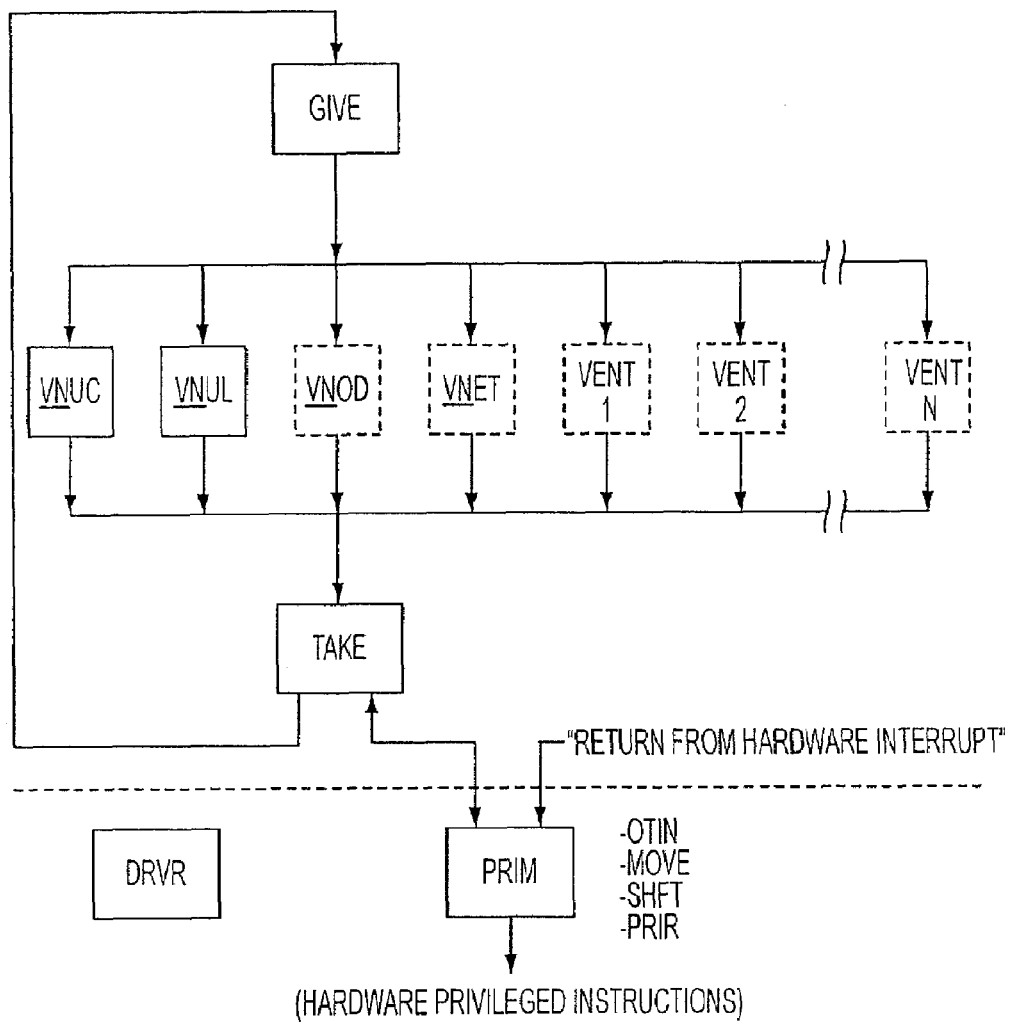

CHART OF LOGIC MODULES FOR VN®

- ADAPTATION LOGIC IN SOLID LINES, VENTS IN BROKEN LINES.

- 4 "VN" VENTS ARE INCLUDED WITH VN®; ALL ARE NECESSARY TO ITS OPERATION. EXCEPTING VNUC AND VNUL, EACH MAY BE FURTHER CUSTOMIZED OR ENHANCED BY USERS. ACTUALLY VNUC AND VNUL ARE NOT VENTS BUT EACH USES THE "SPEAK-LISTEN" POWER TO ACCOMPLISH ITS FUNCTION.

- THE GIVE-TAKE CYCLE IS EXECUTED AT LEAST ONCE FOR EVERY VENT "SPEAK".

- VNUC AND VNUL ARE NOT TRUE VENTS BUT ARE PLACED HERE, IN THE LOGIC, IN ORDER TO HAVE ALL VENT "SPEAK-LISTEN" POWER AVAILABLE TO THEM.

FIG. 3-9

ENTITY NAME  ENGR
TABLE NAME  HELLO

AID FOR (DELEGATING, DESIGNING) BEHAVIOR
DRVR EXECUTES THIS TABLE

| CONDITION OR ACTION | NAME OF CONDITION, ACTION OR TABLE | 1 | 2 | 3 | 4 | 5 | 6 | ELSE |
|---|---|---|---|---|---|---|---|---|
| TELEPHONE OR TELEPRESENCE (NOT E-MAIL) | TEST 1 | Y | Y | Y | Y | N | N | |
| MY MANAGER | TEST 2 | Y | Y | - | - | - | - | |
| MEMBER OF ABCD CORP.? | TEST 3 | - | - | Y | N | N | Y | |
| AM I SIGNED-ON? | TEST 4 | Y | N | Y | | | | |
| | | | | | | | | |
| "INTERRUPT MOMENTARILY, URGENT CALL" (SPEAK) | ACTN 1 | X | | | | | | |
| CONNECT ME DIRECTLY TO MANAGER | ACTN 2 | X | | | | | | |
| RING ME ON MY DIGITAL WIRELESS (SPEAK) | ACTN 3 | | X | | | | | |
| SAY "PRESS 1 IF CORPORATE, 2 IF SALES..." (SPEAK) | | | | | X | | | |
| | | | | | | | | |
| INSIDER ABCD CORP. (TABLE) | INSIDE MAIL | | | | | | X | |
| OUTSIDER ON (TABLE) | OUTSIDE TALK | | | | X | | | |
| OUTSIDE MAIL | OUTSIDE MAIL | | | | | X | | |
| SEND TO ENGR PERSON (SPEAK LARS) | | | | | | | | X |
| REPEAT THIS TABLE | | | | | | | | |
| RETURN TO CALLING TABLE | | | | | | | | |

FIG. 3-10a

ENTITY NAME ENGR  AID FOR (DELEGATING, DESIGNING) BEHAVIOR
TABLE NAME INSIDE MAIL

| CONDITION OR ACTION | NAME OF CONDITION, ACTION OR TABLE | 1 | 2 | 3 | 4 | 5 | 6 | ELSE |
|---|---|---|---|---|---|---|---|---|
| FROM MFGR? | | Y | Y | N | | | | |
| ORDER FORMAT? | | Y | Y | | | | | |
| ALL STOCK PART #S? | | Y | N | | | | | |
| | | | | | | | | |
| ATTACH FABRICATION SPECS FOR EACH PART | | X | | | | | | |
| FORWARD ORDER TO MFGR (SPEAK) | | X | | | | | | |
| DISPLAY ORDER FOR ENGINEERING DESIGN (SPEAK) | | | X | | | | | |
| DO ENGINEERING DESIGN AID (TABLE) | | | X | | | | | |
| SEND TO ENGR PERSON (SPEAK LARS) | | | X | | | | | |
| | | | | | | | | |
| REPEAT THIS TABLE | | | | | | | | |
| RETURN TO CALLING TABLE | | | | | | | | X |

FIG. 3-10b

ENTITIES MOST FREQUENTLY VISUALIZED (ALMOST ANY ENTITY COULD BE VISUALIZED)

| ENTITY | NATURAL OR CONSTRUCTED | COMMON NAME | EXAMPLE | EXIST AT LEVEL? | | |
|---|---|---|---|---|---|---|
| | | | | CONSCIOUS | SUBCONSCIOUS | PHYSICAL |
| PHYSICAL PERSON | N | HUMAN | BETH HANK YOU | YES | YES | YES |
| CONCEPTUAL PERSON | C | RESPONSIBILITY | TELLER MANAGER ABC CORP. LIBRARIAN | NO | YES | NO |
| PHYSICAL DEVICE | C | IMPLEMENT | FORK PUMP MODEM | NO | YES | YES |
| CONCEPTUAL DEVICE | C | ALGORITHM | TAX CALCULATION PAYROLL LINEAR PROGRAM | NO | YES | NO |

PERSONS OF BOTH TYPES ARE AUTONOMOUS WITH UNSOLICITED PROGRAM COUNTERPARTS. PERSONS HAVE MULTIPLE CONTEXTS, AUTOMATICALLY RECOGNIZE THE CONTEXT AND ALL DATA/INFORMATION BELONGS TO THEM.

DEVICES OF BOTH TYPES ARE NOT AUTONOMOUS WITH SOLICITED PROGRAM COUNTERPARTS. DEVICES HAVE A SINGLE CONTEXT AND NO DATA/INFORMATION BELONGS TO THEM. (NORMALLY DEVICE PROGRAM COUNTERPARTS INVOLVE NO PROCEDURAL PORTIONS, ONLY CONSTANTS, A KIND OF "SLIDE-IN TRAY OF CONSTANTS.")

FIG. 4-2

ANALOGOUS DESIGN PRINCIPLES FOR ALL CONSTRUCTED ENTITIES

| DESIGN PRINCIPLE | RESPONSIBILITY= CONCEPTUAL PERSON | ALGORITHM= CONCEPTUAL DEVICE | IMPLEMENT= PHYSICAL DEVICE |
|---|---|---|---|
| THE CONSTRUCTED ENTITY HAS: | EXAMPLE: ANY STATE IN THE USA | EXAMPLE: TAX CALCULATION | EXAMPLE: TEMPERATURE SENSOR (OR TRANSDUCER) |
| 1 A FUNCTION OR PURPOSE | TO GOVERN OR CONTROL THE HUMAN POPULATION WITHIN ITS BOUNDS | TO ASSIST CALCULATION OF TAXABLE AMOUNT | TO CAUSE A HEATER SUB-ASSEMBLY TO IGNITE A VARIABLE RATE HEATER WHEN SENSED TEMPERATURE IS LESS THAN SET TEMPERATURE |
| 2 A LIMITED OR BOUNDED AREA OF OPERATION OR AUTHORITY | JURISDICTION LIMITED BY ADJACENT STATES AND BY AREAS AND POWERS RESERVED BY THE FEDERAL GOVERNMENT. | LIMITED TO AMERICAN CITIZEN, NO CAPITAL GAINS AND <9 DEPENDENTS | WITHIN TEMPERATURE LIMITS OF 20° < 220°C; (INPUT ~ 12V&1m amp) |
| 3 THE CAPABILITY, POWER OR AUTHORITY TO ACCOMPLISH ITS FUNCTION | WITHIN ABOVE LIMITS POWER TO ENACT AND ENFORCE ORDINANCES | WITHIN ABOVE LIMITS ABLE TO CALCULATE TAXABLE AMOUNT | WITHIN ABOVE LIMITS DEVICE OUTPUT ~0.1m amp FOR EACH DEGREE SET TEMPERATURE EXCEEDS SENSED TEMPERATURE. |

FIG. 5-2

VIRTUALIZED NETWORK

CLAIM OF PRIORITY

Priority is claimed under 35 U.S.C. § 119(e) from U.S. Provisional Application Ser. No. 60/223,792, filed Aug. 8, 2000, the disclosure of which is herein incorporated by reference in its entirety.

BACKGROUND OF THE INVENTION

A. Field of the Invention

The present invention relates generally to computer networks, and more particularly to a virtualized network, that provides connection and automation via a real-to-virtual correspondence without the need for either systems or the systems development process.

B. Description of the Related Art

Things and actions are twisted or contorted in conventional computer system design processes. The more comprehensive the system the more pronounced such distortions. This condition occurs because there is no simple correspondence between the way things act in the real world and the way things act within the computer.

Stored program machines (or hardware platforms; i.e. ENIAC and its successors to this day) are viewed as calculators, giant brains, and what eventually stuck, as computers. The lack of correspondence is a direct consequence of this limited view of the stored program machine, the "computer" view.

From the very beginning, most people recognized the stored program machine as a powerful and general-purpose facility. It was acknowledged to be quite different from anything that preceded it. Yet people viewed it as a processor, and from the very beginning, persisted in calling it a processor, a calculator, a giant brain, or a computer. In doing so, and without conscious thought, the stored program machine was given a "personality." Lost was its general-purpose attribute. It was/is assumed to be a processor, a computing device.

A device is connected to its end use or application by an arrangement or system. For every different application a different system is required. A connection standard is required if a single device is to handle more than one application. For a device (the stored program machine under this assumption) to start up and work through a second system, for a second application, requires special policies or procedures known as protocols. When a single stored program machine is applied to more than one use, independent of whether it is classed as system or user directed, the resultant systems, standards, and protocols make it complicated to operate and maintain.

Systems, with the standards and protocols they beget, are the costly burden that comes with the computer paradigm. Attempting to give life to a virtualized device and person entities becomes unnerving due to the apparent enormity of this task. Constructing the supporting systems, the systems enabling program entities to behave in a virtual environment, is seen as an overwhelming problem.

These difficulties arise from the fact that people view the processor as a device and so must live with systems, standards, and protocols.

An underlying problem has frustrated systems development and maintenance efforts for decades. Today the problem is subliminal and is taken as normal, but it was more visible and a clear disappointment early in the era of programmable machines (hardware platforms). Even then, an unadorned programmable machine, "did exactly what you told (or instructed) it to do", accurately, faithfully, tirelessly—so its enormous value was perceived immediately. From the beginning, it seems, people held two basic expectations concerning the machine.

First, because it "does exactly what you tell it to do", people believed it would be universally applicable, capable of automating any real world function or functions. This would become true as programmable machines connected, electrically, to more and different types of devices. And, over 50 years, this expectation has been realized, proved repeatedly. So today's culture retains great confidence that programmable machines, properly outfitted, configured and instructed, can automate any real world functions that can be described.

Second, again because it "does exactly what you tell (or instruct) it to do", people believed they would be able to automate their own real world functions, by offloading those functions to a programmable machine just as one offloads organizational functions to a human subordinate or personal functions to a personal aide. Roughly speaking, they expected, that you would instruct the machine as you instruct your human helper thereby giving the job, the execution of the real world functions, to the machine.

However, this second expectation, that you could automate, offload or delegate frequent or routine real world functions—offloading them to a machine as you previously offloaded them to a subordinate, has not been realized. Telling the computer what to do turned out to be quite complex.

Throughout history, as individuals became less insular and more dependent upon one another, societies defined ever more specialized functions, specialization being the key ingredient in the success of societies. Organizations deliberately planned, grouped and parceled out functions. Indeed a prime purpose of organization was to separate function and responsibility into effective parcels. And the more specialized and limited functions became, the more they needed to interact, simply and directly, with other similarly specialized and limited functions. Specialized functions and constant interactions continue as a hallmark of today's society.

Unfortunately, in order to apply computers, to automate real world functions, an artificial system must be developed. Even perfectly proper real world functions must be reanalyzed, redefined and reorganized in order to automate them. They must go through a systems development process. The newly developed system then embodies or contains the re-represented functions. Since the original real functions were broken-down, redefined, and logically repositioned, in the systemization process, the interactions between the real and the reconstituted functions differ as well.

Only after systemization is the system ready to be encoded. But, encoding is like translating to a human helper who speaks a foreign language; it actually doesn't change the instructions; it just states those same instructions in a different language.

Nevertheless, the original user instructions, which would have been given directly to a real world subordinate, are twisted and distorted in the conventional systems development process. The programmable machine receives different instructions, about differently defined functions, with different logical interrelationships. To accomplish the very same job the machine and the subordinate must work from different scripts.

In the conventional use of programmable machines, functions as represented in the virtual world, inside machine memory, bear little resemblance to the original real world functions. So, the user, the supposed beneficiary of automation, no longer knows how his functions are being handled or how to explain the improvements he wishes to make. He looses control over his own automated functions (and usually is not held accountable for them). To make even the slightest change he must go back through the technology chain, through IT, outside consultants, enterprise-wide package suppliers and outsource vendors, with its multiple chances for misunderstanding, to eventually effect his smallest change.

Obviously, scrambled functions arise in the development of a single system. But once encoded, that single system is placed into the virtual world of machine memory amid a legacy of other, pre-existing systems. It must interact correctly with these systems. And in modern computers, user level functions depend upon many lower level system functions, each one of which has gone through its own systemization process.

Consider that a user system request which goes to/through an executive function, to/through a communications function, to/through a query language protocol function, to/through a security function (firewall), to/through a database function, to/through an I/O driver function just to read information, must fit correctly within a highly interdependent set of systems. The functions of any one system are interwoven and entwined with those of other systems. In general, the functions within one system cannot be changed without affecting the others. Once a part of this legacy of systems, every change, whether at the user or systems level, becomes a command decision.

In the end, then, telling the computer what to do turned out to be quite complex: (1) because of the technical difficulties of reanalyzing, redefining, and logically repositioning functions in the systems development and maintenance processes; (2) because of the loss of user familiarity with, and control over, the redefined, reconstituted and repositioned functions; and (3) because of the functional interdependency, the interweaving and entwining of newly automated functions with previously automated functions.

These problems have persisted and grown over 40 years. They will neither go away nor get better with time. Traditional use ensures that such problems will continue to be a frustrating and ever more costly legacy.

Until now no one seriously considered that programs might function for, i.e., virtualized devices operate for and virtualized persons live for, their counterpart real entities. If such programs could be made to absolutely mimic any action of their real, device or person counterpart, then the functions of those entities could be automated without systemization. Thus there exists a need for a network that provides real/virtual correspondence but without the very systems development efforts necessary in conventional computer systems.

SUMMARY OF THE INVENTION

The present invention satisfies the needs of the related art with a virtualized network that provides real/virtual correspondence, without the design and programming effort utilized in conventional systems. The virtualized network of the present invention places and assigns an entity counterpart, a program, inside the virtualized network for every real entity contained in the portion of the real world to be automated. The virtualized network also ensures the action of each virtualized counterpart exactly mirrors and mimics the action of its real counterpart.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 2-1 is a schematic diagram showing a conventional computer system and the virtualized network of the present invention;

FIG. 3-1 is a schematic diagram showing how virtual space is allotted in a stored program machine used in accordance with present invention;

FIG. 3-4 is a schematic diagram showing an example of a hardware configuration of the virtualized network of the present invention;

FIG. 3-5 is a schematic diagram illustrating a VENT TABLE used with the example of FIG. 3-4;

FIGS. 3-6 and 3-8 is a schematic diagram showing the relation of a program counterpart to a physical counterpart of the virtualized network of the present invention;

FIG. 3-7 is a schematic diagram showing how PAKTs (data and action) pass between the virtual and physical worlds in the virtualized network of the present invention;

FIG. 3-9 is a chart of logic modules for the virtualized network of the present invention;

FIGS. 3-10a, b, and c are charts illustrating how procedural logic is conveyed to, and executed by the virtualized network of the present invention;

FIG. 4-1 is a chart showing entity types and where they exist in the virtualized network of the present invention;

FIG. 4-2 is a chart showing the entities most frequently virtualized with the virtualized network of the present invention;

FIG. 5-1 is a chart showing entity types and where they exist in the virtualized network of the present invention;

FIG. 5-2 is a chart showing analogous design principles for all constructed entities of the virtualized network of the present invention; and FIG. 5-3 is a chart showing a purposeful community of the virtualized network of the present invention.

Figure 1:
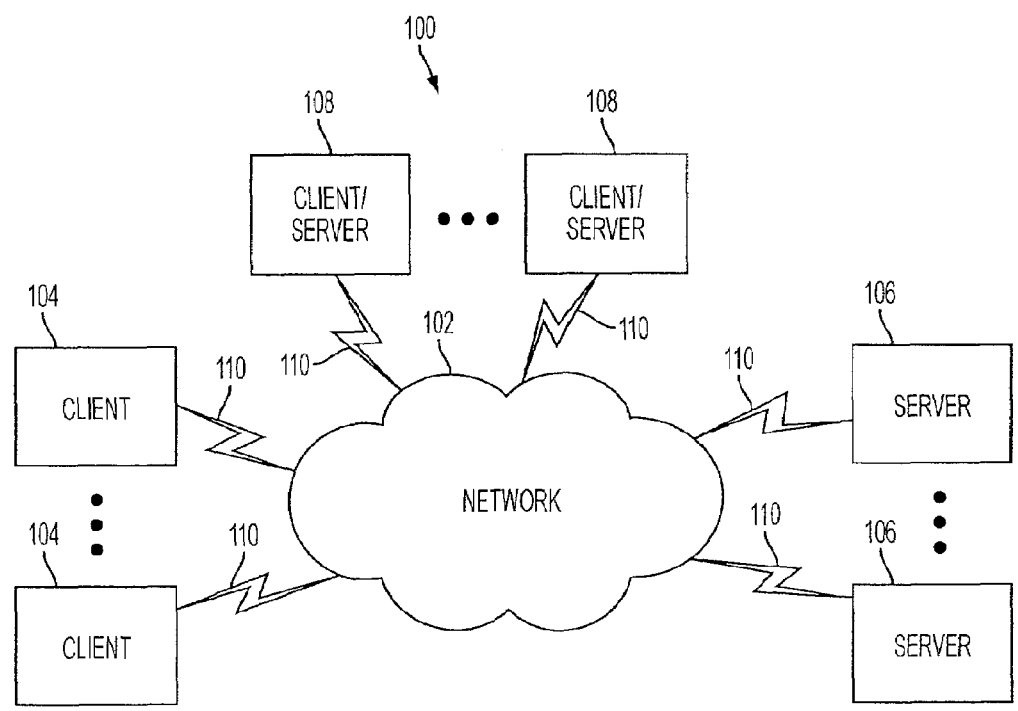
FIG. 1 is a schematic diagram showing a system of an embodiment of the present invention.

DESCRIPTION OF THE PREFERRED
EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The present invention is broadly drawn to a new approach that overcomes the systems development and maintenance problems inextricably associated with computers. A new perspective on how to employ programmable machines, this approach allows a person to automate his own responsibilities, in a direct and straightforward manner, without going through a systems development process. Since the responsible person retains the first-hand knowledge of his own functions as automated, he also retains the ability to alter or improve those automated functions, again directly and straightforwardly, without going through a systemization process.

The capability to automate is separately and independently available to everyone, so the present invention allows the functions of entire organizations to be gradually automated as each employee, independently, automates his own functions.

An attractive solution might rely on today's programmable machines and utilize today's programming languages without any alteration. It might connect with and support existing technology. It might avoid the above burdens by avoiding the functional scrambling implicit in the systems development process. Between a real world function and its virtual representation within machine memory, there could exist an exact 1-to-1 correspondence. This would fix the underlying problem, and enable functions, automated in the virtual world, to be instructed as and then function for, their real world counterparts.

In such a situation, automating functions would be like telling your foreign speaking subordinate, the programmable machine in this case, what you want done, knowing, "it will do exactly what you tell it to do"—accurately, faithfully, tirelessly—and without the costs, frustrations and distortions of systems development. In precisely this way the present invention solves the underlying problem and recaptures the early promise of programmable machines.

This invention is the logical extension of any programmable machine (a stored program machine comprising a processor and memory combination). It provides a radically different memory environment for programs and enables the automation of real world functions without the systems development steps previously required.

A software kernel is a program itself and is the logical extension or adaptation of a programmable machine. A kernel adapts a computer to provide a particular systems environment, within machine memory, for operating system, middleware, and application system programs. Technically designed and developed systems are the essential characteristic of computers.

The different adaptation of this invention is a program also like the software kernel. However, within machine memory, it provides an environment for virtualized entities rather than an environment for systems. Whereas a computer kernel directs machine execution among the various technically designed systems contained therein, this different adaptation directs machine execution among the various virtualized entities contained therein.

The virtualized entities or programs of this machine are virtual (in machine memory) representations of corresponding real world entities, usually persons or devices. One virtual entity or program represents one counterpart real world person or device. Thus entities are the essential characteristic of this new machine which has been called a "Real Entity Automating and Linking Machine" or REALM™.

Instead of laboriously analyzing and designing technical systems to automate real world functions one simply names/ enters the real persons and devices to be automated. Then, at leisure, one may automate some or all functions handled by a person or device by encoding/instructing its virtualized program counterpart. Notice the instructions encoded for a person are the same instructions one would give when passing those functions to a human subordinate. Instructions must be translated (encoded) for a machine exactly as they must be translated for a subordinate who speaks a foreign language.

Three observations about the real world and four invention concepts, together, offer insight as to why and how one may instruct the functions of an entity directly, without developing a system in order to automate them.

First, real world functions are in their proper communal position when embodied in, or contained by, the real entity that performs the functions. Second, real entities include non-physical, conceptual persons (i.e., responsibilities) and non-physical, conceptual devices (i.e., algorithms) along with physical persons and physical devices. Third, every real entity is separate and distinct from every other (except when two are interacting) so their behaviors may be changed independently.

One concept of the invention is that every program is identified with or corresponds to a counterpart real entity like a person or a device. Another concept is that programs interchange data and action by "speaking and listening", interacting as if they are "all in the same room". A third concept of the invention is that whenever necessary a series of entities is assembled, forming a channel, to interconnect any two "speaking and listening" entities. A final concept is that programs may be instructed (procedure added or changed) so they act, automatically, for and on behalf of their counterparts without bothering those real entities.

A. Glossary of Terms

The following is a list of terms important to understanding the Virtualized Network (VN®) of the present invention. Each of the terms is followed by its corresponding definition as used herein.

1. Space—a place where things exist.

2. Entity—an independent, self contained thing; a thing with a separate and distinct existence. Persons and devices are two of many types of entities.

3. Environment—those particular conditions and circumstances that surround and support an entity in a space.

4. World—space together with an environment. For example, the virtual world is the virtual space within the memory of the stored program machine together with the unique environment created by the stored program machine's adaptation.

5. Counterpart—a thing that fits another perfectly; something that completes, a complement. The VN concept holds that the virtualized self is but a counterpart of an already existing entity—is a different aspect of the same one.

6. Virtualized entity (VENT)—an already existent entity that has, additionally, been placed or represented (i.e., "virtualized") into virtual space as a program. A VENT is any entity that has been virtualized, that has the program component. The program may or may not contain a procedural portion. For practical purposes, the portion of virtual space set aside for a VENT appears unlimited. (A person's VENT performs as a kind of subconscious "virtual-self" because it acts on behalf of the person without requiring the person's conscious thought.) Note: although VENT denotes the entire virtualized entity, the word is often used to refer to the program counterpart only.

7. Interact—to act upon or influence another (entity). Interacting is the mutual or reciprocal acting or influencing between entities. The virtual environment supports VENT interactions, so to mimic precisely, the interactions of their real world counterpart entities. Where actions are "internal" to a single entity, as interactions between different counterparts of the same entity, the term intra-act is sometimes used.

8. Community—a collection of interacting entities. A dormant or non-interacting entity is not considered part of a community.

9. Purposeful community™—a community created for a reason. A flower club, a corporation, a unit or department of government, or an entire government, are examples. Such purposeful communities apportion specific responsibilities to better accomplish their ends: i.e., a treasurer, a manager of manufacturing, or a president. It is supposed that the purposeful community's purpose will be achieved if all responsibilities are properly discharged.

10. Network—the way entities are connected; the various pathways or channels between entities. Notice that entities, themselves, are the pathways for interactions. They are not simply the endpoints of the interaction or network, rather entities comprise the network itself; they are the conduits of the interaction.

11. Virtualized network—a network comprised of VENTs.

12. View (VIEW)—a context, perspective or "point of view". The mental category or topic assigned to clarify situations. Within VN, a VIEW is that slice of virtual space, apparently unlimited in size, by which certain data/information may be kept separate or "in context".

13. Orthogonality—the property of being independent one of another. One can be changed without affecting the other! In mathematics, orthogonality exists between two sets when there is no correspondence between their respective elements—when their correlation coefficient is zero. [In VN each VENT enjoys this property with respect to every other—except when it interacts with that other!]

14. Subliminal—existing or functioning below the level of conscious awareness.

15. Premeditate™—to think through ahead of time; mental consideration and resolution beforehand. Premeditation establishes (or programs) later action and behavior (often called reaction since the person thought about it ahead of time).

16. Context—the interrelated conditions in which something exists or occurs. A setting.

17. Personality—the complex of characteristics that distinguish an individual or group.

18. Autonomous—self-governing. Able to respond, react, and initiate independently.

19. Relationship—the existing state of affairs between those having relations or dealings. In VN, the relationship between two entities is defined by the history of the interactions between them.

20. Information/data—the simple discernment humans make from things seen, heard, tasted, smelled or felt. Information is not an entity! [It is more like "understanding" than it is like "stuff although it is thought of as the latter because it is remembered or stored as patterns of stuff associated with a device.] An autonomous entity discerns value only when it places new information against its existing context. The new information always changes that context. Because so little is known of other autonomous entities, probably a person is the only one that will be regularly virtualize.

21. Program—a contiguous portion of virtual space, a module. It contains procedure and data or data only, and is enabled to act independently—without the necessity of involving other programs. A VN® program is completely supported by its environment and does not require or rely upon other programs to accomplish its purposes. The Virtualized Network of the present invention may comprise any real world entity, or in the case of man-made entities either the simple component devices or a collection of devices united and functioning together. The collection may be looked upon as some device.

22. Systemization—the "systems development" activities, except for the instruction encoding itself, required to automate real world functions on a computer. Systemization is the re-analysis of the real world functions, their breakdown, redefinition, reconstitution, and logical repositioning inside machine memory in order to automate them. This present invention permits functions to be automated in place, without change, mimicking the known actions and reactions of those same functions in the real world.

23. Device (DEVC)—something devised or contrived, a procedure or technique. A 20 piece of equipment or mechanism designed to serve a special purpose or perform a special function. In VN® a device is an artificial entity, not part of the natural world, but conceived and constructed by men (ex. a modem, a gearshift, a system or a protocol—all artificial, contrived entities invented by men).

24. Function—the action for which a person or thing is specially fitted or used or for which a thing exists. (Function implies a definite end purpose served or a particular kind of word the person or thing is intended to perform.)

So the network of the present invention may comprise an Internet, intranet, extranet, local area network (LAN), wide area network (WAN), metropolitan area network (MAN), telephone network such as the public switched telephone network (PSTN), a similar network, or a combination of some or all of the above.

In accordance with the invention and as shown in FIG. 1, the system 100 of the present invention includes a network 102 that interconnects client entities 104, server entities 106 and client/server entities 108 via communication links 110.

Network 102 may comprise an Internet, intranet, extranet, local area network (LAN), wide area network (WAN), metropolitan area network (MAN), telephone network such as the public switched telephone network (PSTN), or a similar network.

The Internet is a collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing protocols.

An intranet is a private network that is contained within an enterprise. It may consist of many interlinked local area networks and also use leased lines in the wide area network. Typically, an intranet includes connections through one or more gateway computers to the outside Internet. The main purpose of an intranet is to share company information and computing resources among employees. An intranet can also be used to facilitate working in groups and for teleconferences. An intranet uses TCP/IP, HTTP, and other Internet protocols and in general looks like a private version of the Internet. With tunneling, companies can send private messages through the public network, using the public network with special encryption/decryption and other security safeguards to connect one part of their intranet to another. Typically, larger enterprises allow users within their intranet to access the public Internet through firewall servers that have the ability to screen messages in both directions so that company security is maintained. When part of an intranet is made accessible to customers, partners, suppliers, or others outside the company, that part becomes part of an extranet.

An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company.

A LAN refers to a network where computing resources such as PCs, printers, minicomputers, and mainframes are linked by a common transmission medium such as coaxial cable. A LAN usually refers to a network in a single building or campus. A WAN is a public or private computer network serving a wide geographic area. A MAN is a data communication network covering the geographic area of a city, a MAN is generally larger than a LAN but smaller than a WAN.

PSTN refers to the world's collection of interconnected voice-oriented public telephone networks, both commercial and government-owned. It is the aggregation of circuit-switching telephone networks that has evolved from the days of Alexander Graham Bell. Today, PSTN is almost entirely digital in technology except for the final link from the central (local) telephone office to the user. In relation to the Internet, the PSTN actually furnishes much of the Internet's long-distance infrastructure.

Other entities may be virtualized into the network. A device-type VENT may include software, such as programs, threads, processes, information, databases, or objects; hardware, such as a computer, a laptop, a personal digital assistant (PDA), a wired or wireless telephone, or a similar wireless device; or a combination of both software and hardware.

Network connections may be wired, wireless, optical or a similar connection mechanisms. "Wireless" refers to a communications, monitoring, or control system in which electromagnetic or acoustic waves carry a signal through atmospheric space rather than along a wire. In most wireless systems, radio-frequency (RF) or infrared (IR) waves are used. Some monitoring devices, such as intrusion alarms, employ acoustic waves at frequencies above the range of human hearing.

Figure 2:
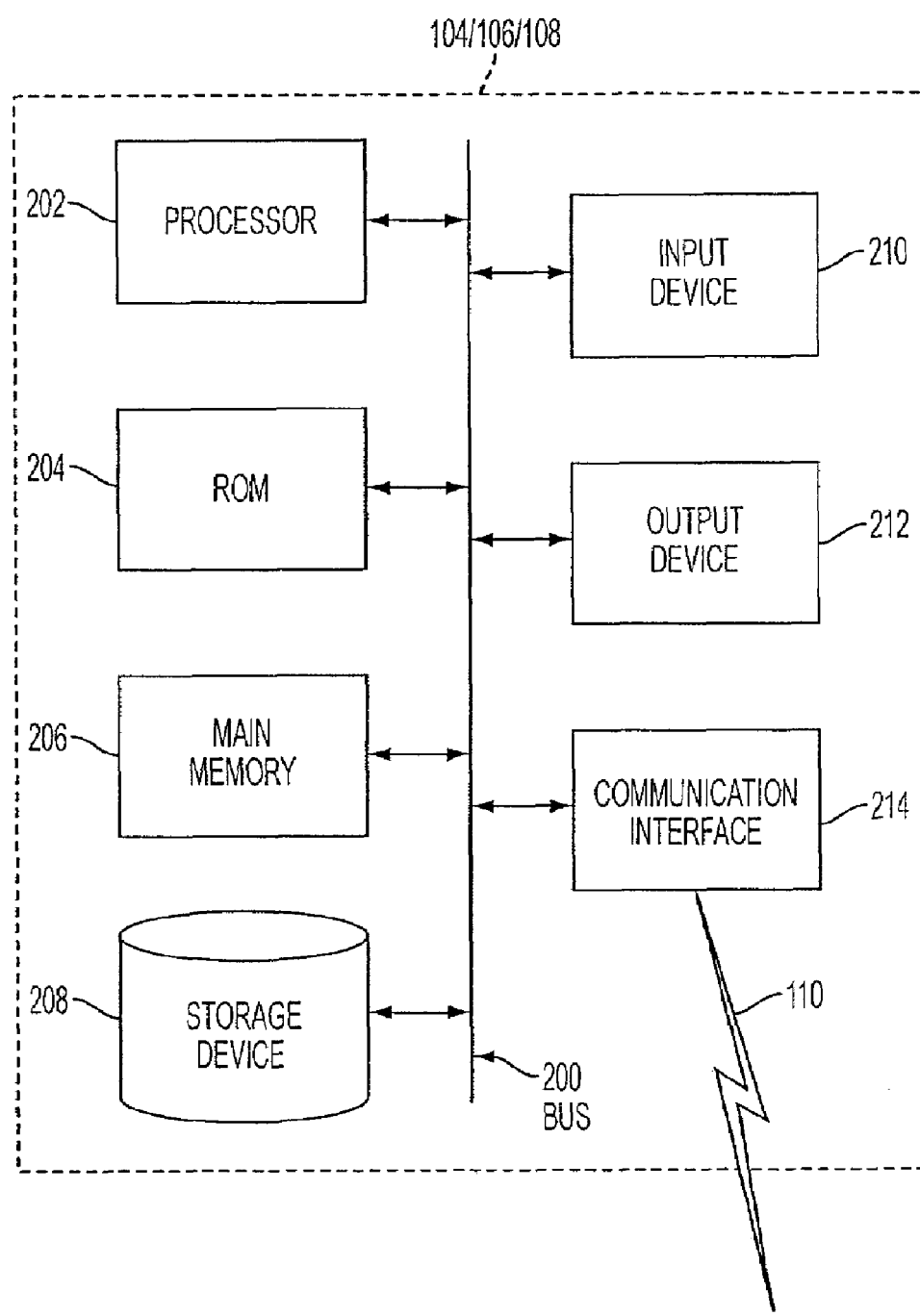
FIG. 2 is a schematic diagram showing a client, server, or client/server of the system of FIG. 1.
Figures 1, 2:
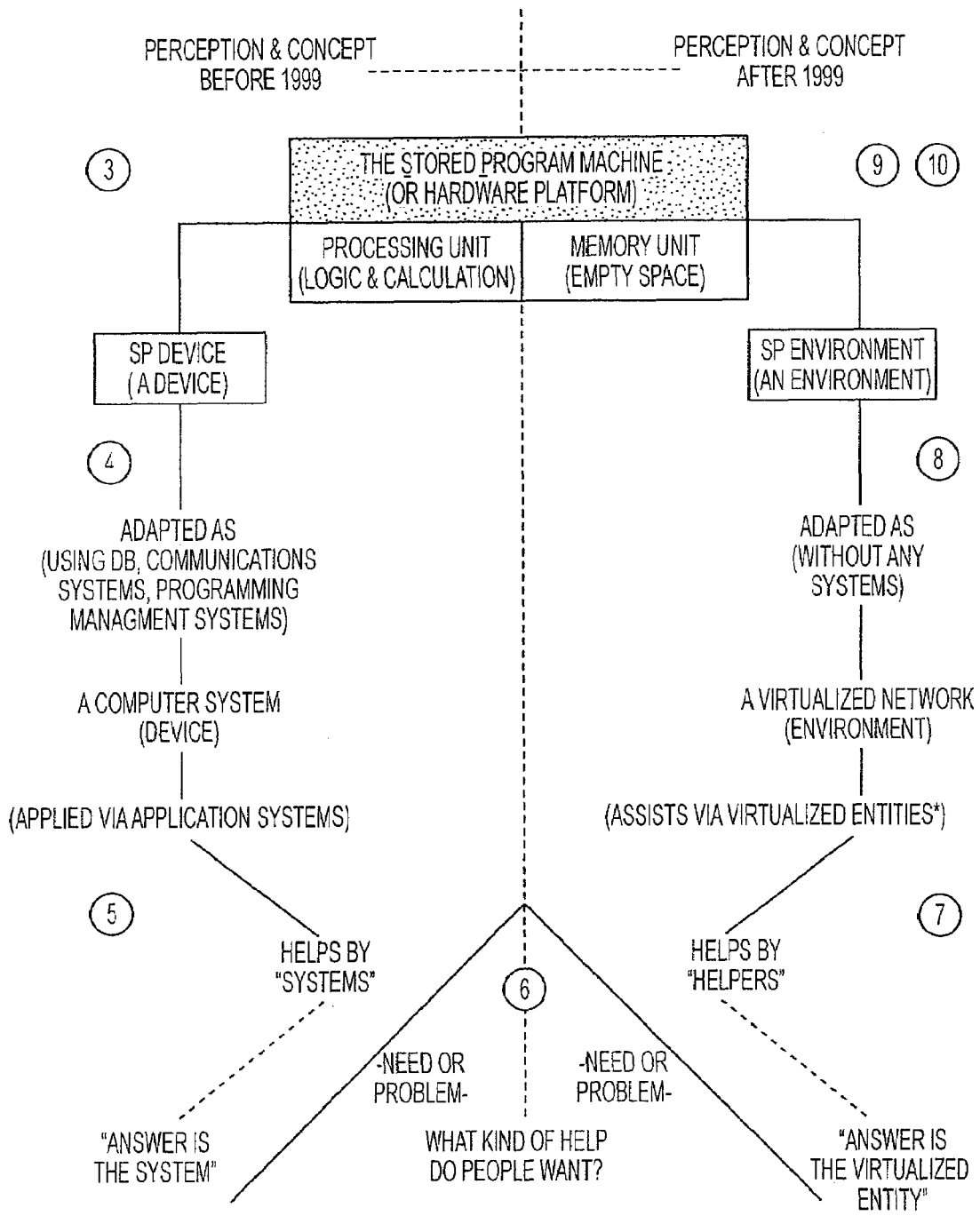

As used herein the term "stored program machine" includes any machine such as a conventional computing machine (e.g., a computer) that includes a bus interconnecting a processor, and a main memory. As shown in FIG. 2, an entity, whether it be a client entity 104, a server entity 106, or a client/server entity 108, includes a bus 200 interconnecting a processor 202, a read-only memory (ROM) 204, a main memory 206, a storage device 208, an input device 210, an output device 212, and a communication interface 214. Bus 200 is a network topology or circuit arrangement in which all devices are attached to a line directly and all signals pass through each of the devices. Each device has a unique identity and can recognize those signals intended for it. Processor 202 includes the logic circuitry that responds to and processes the basic instructions that drive entity 104, 106, 108. ROM 204 includes a static memory that stores instructions and date used by processor 202.

Computer storage is the holding of data in an electromagnetic form for access by a computer processor. Main memory 206, which may be a RAM or another type of dynamic memory, makes up the primary storage of entity 104, 106, 108. Secondary storage of entity 104, 106, 108 may comprise storage device 208, such as hard disks, tapes, diskettes, Zip drives, RAID systems, holographic storage, optical storage, CD-ROMs, magnetic tapes, and other external devices and their corresponding drives.

Input device 210 may include a keyboard, mouse, pointing device, sound device (e.g. a microphone, etc.), biometric device, or any other device providing input to entity 104, 106, 108. Output device 212 may comprise a display, a printer, a sound device (e.g. a speaker, etc.), or other device providing output to entity 104, 106, 108. Communication interface 214 may include network connections, modems, or other devices used for communications with other computer systems or devices.

As will be described below, an entity 104, 106, 108 consistent with the present invention may allow the functions of an entire organization to be gradually automated as each employee, independently, automates his/her own functions. Entity 104, 106, 108 performs this task in response to processor 202 executing sequences of instructions contained in a computer-readable medium, such as main memory 206. A computer-readable medium may include one or more memory devices and/or carrier waves.

Execution of the sequences of instructions contained in main memory 206 causes processor 202 to perform processes that will be described later. Alternatively, hardwired circuitry may be used in place of or in combination with software instructions to implement processes consistent with the present invention. Thus, the present invention is not limited to any specific combination of hardware circuitry and software.

B. The Paradigm Shift From Computers to VN

FIG. 2-1 illustrates, on the left of the FIG., how the stored program machine was originally viewed as a processing device (#3), how it was adapted as a computer and applied via systems to help people (#4,5). On the right side, FIG. 2-1 illustrates how people are helped by being virtualize, by having program counterpart defined and placed into the specially adapted machine environment of a virtualize network.

The entity within the stored program machine remains, just as it was in 1946, "data together with a series of directions or instructions as to what to do with the data". Naturally we call this entity a program entity.

A mirror illustrates certain aspects of the entity correspondence of the present invention. Let the images, reflected by the mirror, correspond to the program entities within the stored program environment. Then, for each physical entity in the view of the mirror there is exactly one reflected image, or a simple 1-to-1 match. In total, the virtualized network reflects the entire desired portion of the real world into the stored program machine. In any event, for every real entity, there is a counterpart program entity (virtualized entity) defined into the stored program machine, which will then able to act for its counterpart.

Entity correspondence is straightforward. For each real entity, a counterpart is virtualized or defined. When a virtualized network spreads beyond enterprise, beyond community with virtualized network nodes all over the globe, there will be only one program corresponding to the virtualized "me" entity. Absolute 1-for-1 matching is the ideal correspondence between real and virtual world counterparts.

This means that the environment supports and allows real-world equivalent actions. If a real entity has its virtualized self, a program, defined into the stored program machine, then for every action/interaction of the real entity, there is an exact equivalent action/interaction available to the program.

Action correspondence necessitated an explicit understanding of entity types, action types, as well as behaviors, roles and relationships of interacting entities, the many nuances and subtleties of our ordinary world. When these are made explicit, the environment of the virtual world supports identical/analogous behaviors, roles, and relationships.

If we go back to the mirror illustration we find it incomplete. A push or pull action may be precisely reflected from the mirror, but a speak or listen action, potentially of great consequence, is not captured at all. Whereas mirrors depend solely on light, speech interaction depends upon a different physical property.

A certain few real world actions need not be mimicked. These are frivolous actions where the outcome or accomplishment is indeterminate. As noted earlier, a flirtatious action/interaction is an example. But all purposeful actions resulting in work done or accomplishment are mimicked. Therefore a manager may write instructions for a new virtualized helper, the same instructions she would write for a real person helper. Because real and virtual perform in identical roles and relationships, and because they have identical actions, they respond identically to identical instructions.

The present invention works with all types of entities, including devices and the human person. When a device is virtualized, for the purpose of automating its operation, the present invention accounts for all of its possible actions and reactions. Everything is defined ahead of time so that it performs automatically. However, one might virtualize a person in part. The virtual self might act/interact on behalf of the real person in certain instances, whatever is felt to be appropriate or useful, with other actions/(responses)/interactions being passed back to the real person for handling. This is the way VN operates although it can handle any action/interaction on behalf of the real person.

One senses the far-reaching impact of this, the potential benefit of both device and people type help, and the natural, straightforward instruction such helpers require.

Considering the stored program machine an environment helps to visualize the present invention. Instead of emphasizing the logic and calculating characteristics of the processor unit, the present invention emphasizes the space characteristic of the memory unit. Within that space the present invention conceives an environment able to support entities, where those entities may operate and/or live.

The stored program machine has been viewed, conventionally, from the processor side, as a device. The present invention views it from the memory side, as empty space, a home for virtualized entities. The stored program machine, as an environment is not itself an entity. If it is an environment, no one can "press its buttons, steer its steering wheel, step on it for any purpose, nor talk to it.

In the present invention, there need be no interactions with the processor (device) from either the real or virtual worlds. Nothing "talks to" the computer. Because the present invention no longer talks to it or applies it as a device, no longer is the processor in the middle of everything. There are no protocols to talk to it, no systems to apply it, and no standards to be enforced on its behalf. The stored program machine, as an environment only, has none of these because it has no interfaces. Of course, during execution it gives its entities "life", but the entities have the action interfaces, the stored program machine has none.

Since the present invention succeeds in neutering all processor-associated complications out of the picture, it may support desired real-virtual correspondence with people type helpers and do it without systems. The present invention virtualizes entities into this environment and finds they properly mimic the actions of, and act for, their real world counterparts.

Two separate areas/aspects comprise and define the virtualized network of the present invention: (1) a perception of the real world—an understanding and viewpoint of the real world that defines the real world entity types, behaviors or actions, situations, roles and relationships that must be faithfully mapped into the virtualized world within the stored program machine; and (2) an adaptation to the stored program machine—a logical construct enabling necessary entity types, behaviors, actions, situations, roles, and relationships to be faithfully mapped from the virtualized world to the stored program machine architecture.

Starting with the VN adaptation of the stored program machine, the present disclosure will describe its workings for virtual world interactions—the program entity-to-program entity interactions. Thereafter, the present disclosure will describe its workings for virtual world-to-physical world interactions—intra-actions between the program entity and its physical counterpart.

Once the logical adaptation is explained, the present disclosure will turn to the VN perception of the virtual, physical, and conceptual (the world of personality and ideas) worlds and how they fit together. By illustration and analogy the present disclosure shows how the VN logic fits into the world, how it mirrors, mimics, and helps people.

C. An Adaptation to the Stored Program Machine

Beginning with the VN adaptation and by way of example, imagine it is August of the year 2001. Hank and Beth, friends in a small town, decide to join an investment club. The club requires that members be virtualized into the virtualized network of the present invention. Beth manages all Teller Operations for a local bank. The bank utilizes VN. As a bank employee she has access to market information, and recently Hank has called several times daily. He always asks, "what's up"—and means by that question—what are the latest DOW and NASDAQ stock averages?

Beth already is virtualized into VN. This allows her to sponsor and actually enter Hank's virtualizing data into VN. Within hours, after she virtualizes Hank, he discovers he can use a terminal to pose his "what's up" question to Beth.

Figures 1, 3:
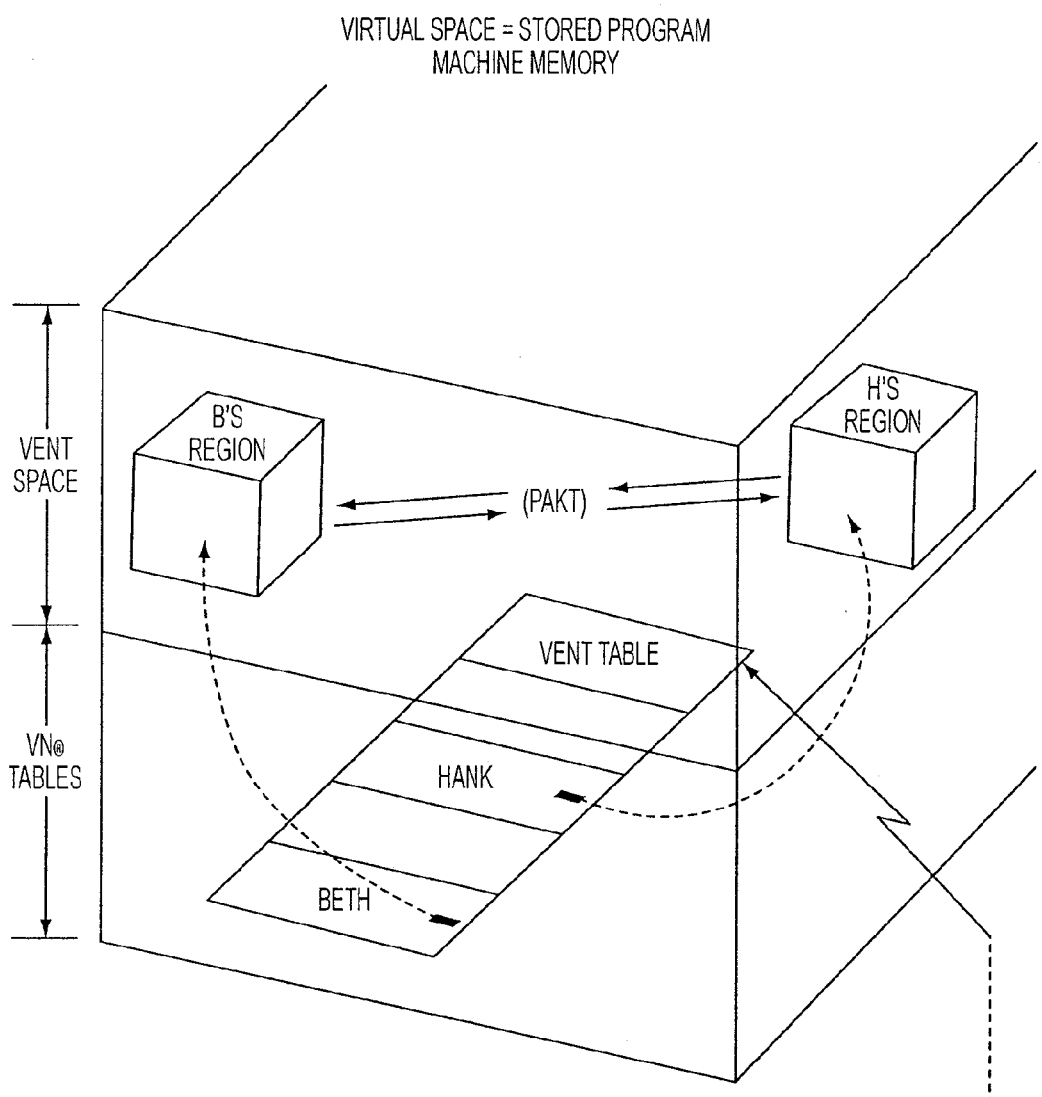

FIG. 3-1 looks inside VN to see how this works, remembering the virtual environment is created by the adaptation to the stored program machine. Memory space within the stored program machine is illustrated in FIG. 3-1. The entry/virtualization of Hank causes his record to be entered into the VENT table, one of four tables used by VN. It contains a pointer to his address in stored program machine memory (virtual space). All program information associated with Hank, now or in the future, will go to this place in virtual space. The same is true for Beth except she was earlier virtualized—so she already had her VENT table entry with its pointer to her virtual space. That is why she was able to sponsor Hank and enter his information.

1. Virtual to Virtual Interactions

When Hank's VENT is executing on his behalf, and it interacts with (speaks to) Beth's VENT, then VN logic, what was termed the stored program machine adaptation, effects the "speak" interaction since it is the environment of the virtual world. It looks-up Beth in the VENT table, finds her memory address in virtual space and moves the resultant spoken data to Beth's memory region. It starts her VENT executing with a pointer to the data packet (PAKT), the second of four table types used by VN. While the VENT table is global, one table for each node, there are many PAKT tables per node. In her region the PAKT looks something like:
 BETH|What's up?|HANK This is the very simple and very straightforward manner in which any virtualized entity "speaks" to any other. "Speak-listen" is the way virtualized entities interact.

Because of Hank's earlier behavior, Beth had pre-meditated this particular occurrence. When her virtualized self or VENT starts executing it knows what to do. It sees "What's up", and sees Hank was the speaker. Its action at this point is premeditated. There is no reason to reference the conscious Beth, so it acts for her, below her conscious level, speaking back to Hank as follows:
HANK|Dow=10354;NASDAQ=2371|BETH VN already knows Hank's region in virtual space as it was contained in the PAKT from him. So, without even looking him up in the VENT table, VN moves this data to Hank's memory region. It causes his VENT to begin execution at the right place, and as before, provides a pointer to this answering PAKT.

Summarizing virtual to virtual interaction: A virtualized entity (VENT) executes as programs always have executed. During execution a VENT takes action, with regard to anything outside itself, by "speaking" as we have just seen. VN accepts the data contents from the speaking VENT. It always knows the "speaker", and knows the "listener" (unless it is the first "speak" of a conversation when it must look-up the listener's location in a VENT table). VN moves the data to the "listener's" region, and, when it has no higher priority, passes execution to that listener VENT. In this fashion, VN passes data and action from one VENT, whether person or device, to another VENT, either person or device. Every stored program machine has an identical adaptation and everyone operates as above, repetitively, and at all times, for all interactions by all VENTs within its virtual space.

When a VENT analyzes, i.e., as it identifies a situation and prepares to act, it does so quite similarly to the programs that have been used over the years. The only change here is that VN uses/supports decision table type "thinking", first identifying a situation as it was pre-meditated, then taking action(s) according to the premeditated order of those actions. This is much closer to the way people actually think. It is just the way one would write instructions for another person, telling that person how to identify and act in a particular situation—what to look for to identify the situation, and then upon finding it, telling it precisely what to do.

However, when the analysis is complete, and the VENT acts, when it steps out of itself to interact with other entities, then its actions exactly mimic its real world counterpart. A VENT never speaks to a "system," to a "processor/computer," to "information or data," or any artificial systems or technical entity. A VENT always speaks to another VENT. Of course, each matches 1-for-1 with its counterpart.

For example, when Beth virtualized Hank by providing certain data, she/her VENT never spoke to the stored program machine (processor or computer in today's terminology). Recall a stored program machine, in combination with the adaptation, is not an entity; it is an environment. No, her VENT spoke to another VENT. Specifically, it spoke to the person, the VENT of the person, who manages her bank's own stored program machine. That person's VENT most likely included premeditated handling for the virtualization of a new entity because that is a normal responsibility of the VN machine manager. The machine manager's virtualized self already "knew" that bank policy permitted virtualization of a non-employee, on the bank's stored program machine, if no other machine was specified. As Hank's virtualization was normal the machine manager's VENT acted without his conscious involvement. That part of the stored program machine manager's responsibility was automated.

Returning to our example of August 2001, imagine that just as Beth's VENT answers Hank's question, she receives a phone call. It seems an acquaintance is trying to withdraw $30 from one of the bank's automated tellers (ATMs), ATM#4 to be exact. The acquaintance is aware of Beth's responsibility for Teller Operations, both human tellers and ATMs.

She inquires via her cell phone, "Beth your machine is hung-up with my cash card. Can you help me?" "I'm glad you called. I will see what I can do," Beth replies. Working from her terminal, she notes the $30 reserved for disbursement, but not yet disbursed. Since the ATMs are her responsibility she, her VENT actually, may "speak" directly to them. As we have seen all VENT-VENT interactions move PAKTs something like:
 Beth to ATM4 ATM4|bit string device order|BETH
 ATM4 back to Beth BETH|bit string acknowledgment|ATM4

In the ensuing conversation Beth's bit strings "speak" as follows:
 Reset to ready status
 Move to the 20's dispense tray
 Dispense 1
 Move to the 10's dispense tray
 Dispense 1
 Disburse bills to customer
 Return cash card
 Reset to idle for next customer Interspersed with the above are ATM4's "speaks" or acknowledgments:
 Ready ok
 20's ok
 Dispense 1 ok
 10's ok
 Dispense 1 ok
 Disburse ok
 Return card ok
 Idle/waiting ok Beth hears the acquaintance say, "hooray, I have my card and the $30, thanks for getting the device to function again."

Because programs have been speaking to devices for years there is nothing surprising in this example of VENT-VENT interaction. Yet it does show that the speak-listen type interaction of the virtual world may result in the physical movement of items (dollar bills) in the real world. The same kind of speak-listen can cause a hydraulic arm to push an auto body into welding position, can cause a brick baking oven to raise temperature, and the like. In fact, the virtual world speak-listen type interaction suffices to mimic all possible real world interactions including push-pull, burn, etc., as well as real world speak-listen.

So a single type of virtual world interaction, i.e., speak-listen, which appeared to be a shortcoming, seems perfectly sufficient now. Actually, it is a simplifying property of VN, simplifying all actions that utilize virtual world pathways.

2. No Artificial Systems, Standards, or Protocols

In order to affect its single type of speak-listen interaction, VN utilizes the familiar mode of bit strings and binary logic and the older familiar medium of electrical transmission. Because they always share this same mode and medium when interacting, VENTS have an advantage over the way their physical-world counterparts interact.

Not as an example, but simply to illustrate mode and medium problems, assume person A and person B share and understand the same language, English for instance. Also assume that over the years person A became blind and person B became deaf. Person A says "hello" to person B but person B is deaf so the interchange fails. Person A realizes he will have to use a different mode of communication, say signal lights or sign language, to communicate, and then they will do fine. Person A chooses to sign "hello" without realizing it is a dark night so the interchange fails once more, though the signing mode would have been fine during daylight. They need to find a transmission medium, consistent with an otherwise acceptable mode, in order to communicate.

If person A and person B enjoy the full and normal use of all their senses, share the same language, interact in the correct mode (talking), through a consistent medium (air which conducts sound waves), but are in distant rooms, their interaction fails since person A's voice does not reach person B.

Mode, medium, and distance, these are the problems that come with increasing use of "communications systems." Each is a separation between a person and the person (or device) with whom that person wishes to communicate. Communication systems, standards, and protocols clutter modem life. In contrast, VENTs of the present invention are freed from such clutter since they interact at the bit string, binary logic, and electrical level. And with VN they all appear to be in the same room.

So without preparatory protocols to arrange mode, medium, or location, VENTs directly and instantly interact. This powerful property of VENTS is termed immediate adjacency. Basically, VENTS are very close in all respects, except for natural, or real world, language and behavioral differences.

Every VENT, on the stored program machine at Beth's bank, speaks directly to any other VENT on that machine, and so, is immediately adjacent to every other one. But immediate adjacency is not limited to a single stored program machine. Rather, any VENT, whether person or device, can speak directly to any other, whether person or device, located on any stored program machine anywhere in the world. This occurs without adding a single line of code to the VN core logic or operation, earlier discussed, and without using one line of "communications" system or software. There exists no "communications" systems or software in VN. This feature arises from VN's powerful channeling capabilities, discussed below.

Medium and distance problems are non-existent if action is taken through the virtual world. The language differences, the differences in culture and convention, these mode differences between real world entities (e.g., people) remain differences to be overcome. However, a virtualized network creates no new and artificial differences in mode; it introduces no new systems or protocols between interacting entities. So if Hank had been virtualized on the most obscure stored program machine (perhaps an Intel 386 PC), his VENT would have spoken to Beth, in the identical manner, without specifying a URL, area code, or any other devices or steps. Without protocols, and completely oblivious to where in the world she was, his VENT would speak:

BETH|What's up?|HANK

Such simplicity is not just a benefit to the "user" who works from a terminal or PC. It is even more important to the "user," who wishes to automate parts of his/her activity, and to the programmer, who must encode that premeditated activity.

Today's computer programmer must consider the modules, operating systems, communications systems, database systems, the various "shells" and "levels of protocol," which must be transited in order for his program module to access data or interact with another module. (These are all redesigns of the real-world situation, are artificial, technical constructs.) The experience, knowledge, and time needed to ensure all these are correct, for current releases and configurations, often dwarfs the time for him to encode and test his own module. Of course, he must undergo continual update and training, and must remain alert to those other system improvements (read changes) which affect the operation of his module. This is why he seems to spend inordinate amounts of time, on his in-house computer technical efforts, and precious little time, talking to people to learn about the parts of their responsibility that need automating.

In contrast, with VN the VENT programmer who encodes premeditated instructions has no such problems. He changes no functions of the real-world since they are directly represented in the virtual environment. He encodes exactly what he sees, with no need to restate, rearrange, or twist instructions in order to make them "work within the system" as VENTS do not work within any technical system, but work exactly as you or a helper would work. Obviously then, he is available a much higher percentage of time to understand and encode the decision tables that automate people's responsibility.

Before leaving virtual-to-virtual interactions we should notice the analogy between virtual-to-virtual speak and its physical world equivalent to help understand how the virtual world mimics the physical one.

3. Speak—Listen Analogy

The physical environment provides the needed connection each time one speaks to another. A person tightens their vocal cords so as to transmit data in the form of sound waves. The physical environment accepts those vibrations causing sound waves to spread out until they shake the eardrums of a listener and the sound data enters into his/her brain or thinking space. The listener may act on what he/she heard.

Likewise, the virtual environment provides a VENT the needed connection each time it speaks to another VENT. It "speaks" (analogous to tightening of vocal cords) so as to transmit data in the form of a bit string. The virtual environment accepts those bits causing their movement and entry into the thinking space of the listener VENT. The listener VENT may act on what it "heard" when later passed execution by VN.

A person interfaces with the real world environment when they speak, and their VENT interfaces with the virtual environment when it speaks on their behalf. Notice that neither actually speaks to its respective environment but to another entity within that environment. So interface is not quite the correct word. More correctly, a real or virtual entity uses its environment, but it interfaces with the other interacting entity.

There are no application systems and no operating systems used with the present invention. In fact, just two entities interact in the special virtual environment. As VN machines ship from the plant, and all programs will be VENTs, each one the counterpart of an existing entity, and no artificially created programs or systems of any type will be required.

Finally, the virtual environment remains constant despite changes in stored program machine type, size, configuration, number of VENTs contained therein, or the number of VN machines. Consequently a VENT's use of the environment also remains constant across all hardware platforms, configurations and the like.

4. Virtual to Physical Interactions

Looking at a more complex interaction, more complex only because it turns into, or becomes a series of the familiar speak (listen) type interactions, suppose the interaction involves a physical person or device, and must, in part, go through physical space.

As an example, consider the situation if Beth did not premeditate her behavior for Hank's "what's up" question. Then her virtualized self would not act, but would forward Hank's question to her physical (conscious) self for action.

Lacking a premeditated handling in this situation, the fully conscious Beth must act on Hank's question herself. Her program counterpart accomplishes this using the identical "speak" action used to convey data to any other VENT and it would be totally unaware and unconcerned that a series of speaks are needed to effect her speak. The question may not be forwarded to the physical world unless her virtualized self knows where she is. Her VENT automatically receives her physical location, actually the name of her terminal, when she "signs on" thus allowing her VENT to speak to her and vice versa. She is allowed to sign on at any terminal, on any stored program machine, in the network of networks. VN enables her virtual self to interact or speak to her physical counterpart and vice versa. When she signs off VN again loses track of her location in physical space.

These more complex interactions arise only where data and action must be transferred between an entity's virtual and physical counterparts, that is, between two aspects of the same entity.

This section illustrates how VN implements a virtual to physical connection, what everyone heretofore called a communications network. In a sense, this might be called a first "application" of VN, since it utilizes the basic virtual to virtual speak (listen) to transform the virtual world into a communications network. The illustration involves conventional programming and the consequent advantages are stated conventionally in already familiar terms.

In order to move a PAKT, between the physical and virtual counterparts of an entity, the various "communications devices" comprising the path or channel must be traversed. But no complexity is added to the basic VN adaptation logic. All the data and action passing is precisely as described above, the same, simple speak-listen utilized repeatedly.

It is completely transparent to the interacting counterparts. VN arranges to have each of the intervening communications entities, along a channel, speak in the virtual environment to its adjoining entity, moving the PAKT, or data and action, through the communications channel, from virtual to physical or vice versa.

Let us return to the Beth/Hank example to illustrate how VN works. Assume Hank was stunned with Beth's instantaneous response to his "what's up" question. He keys, and then his VENT speaks for him. The resultant PAKT looks like:

BETH|answered so fast! How??|HANK

Exactly as before, the PAKT is moved to Beth's region and her VENT receives execution. This non-routine situation was neither premeditated nor preprogrammed. Since her VENT's decision tables show no handling for this situation, it must be sent to her physical (conscious) self for handling and action.

If Beth is signed-on, her VENT will notify her immediately, and if not signed-on it will attempt to notify her of PAKTs awaiting a conscious review at 9 am and at 3 pm, but only if she specified a default location. Beth's record in the VENT TABLE shows that she has signed-off. However, she left a default notification location, namely a printer, PRNT B, within view of her as well as others.

Figures 3, 4:
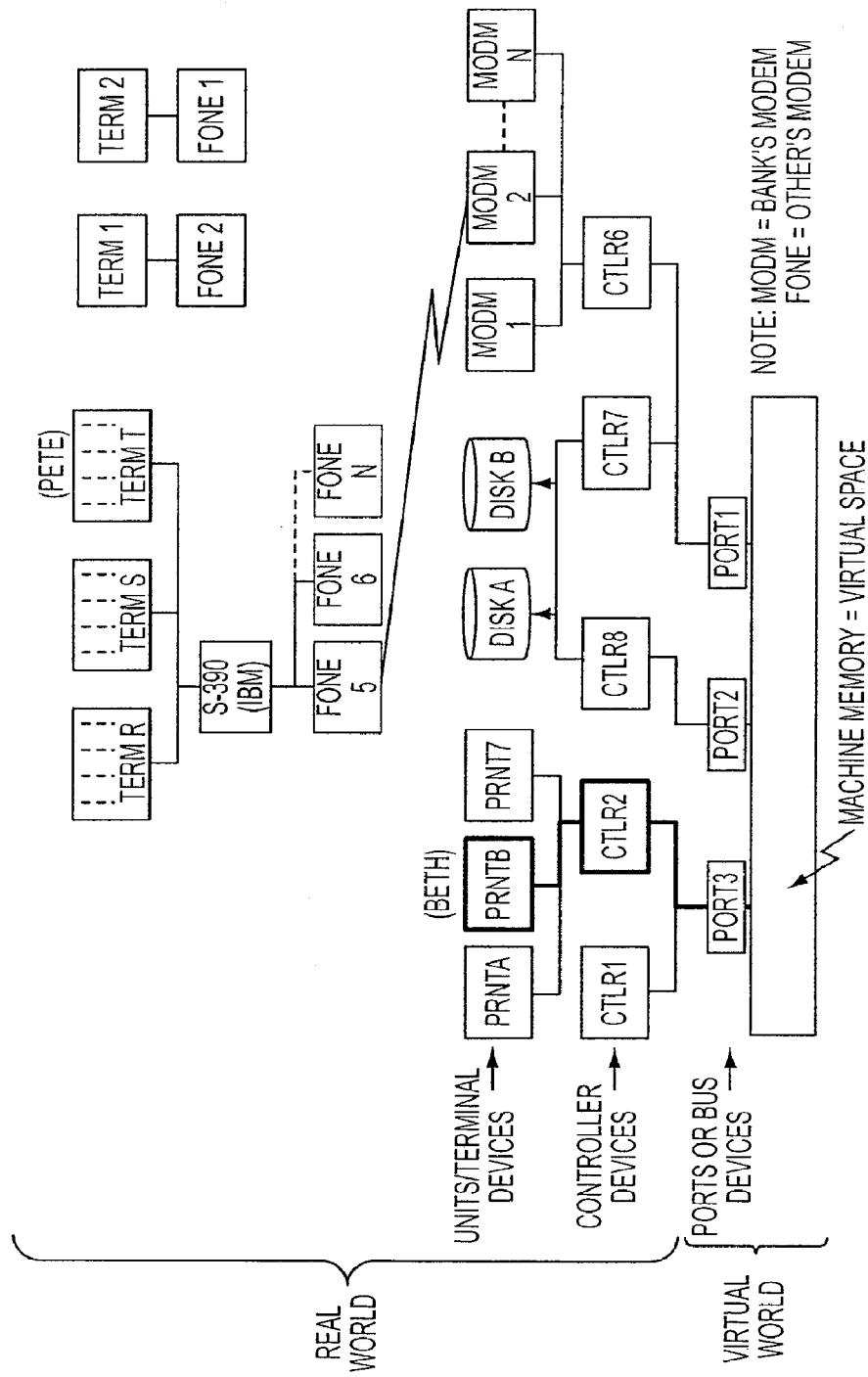
Figures 3, 4, 5, 6, 7, 8:
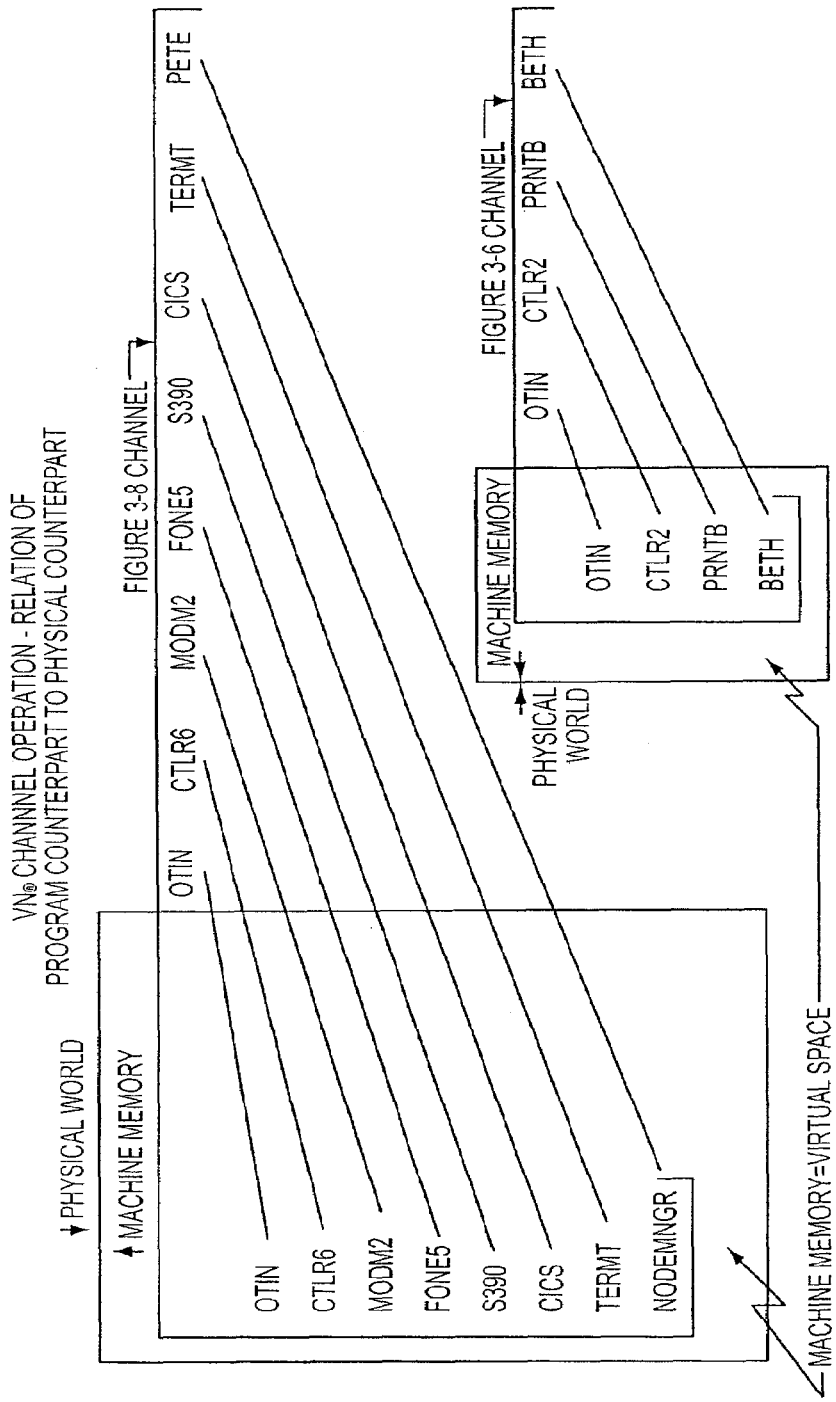
Figures 3, 4, 5, 6, 7, 8, 9, 10, 10C:
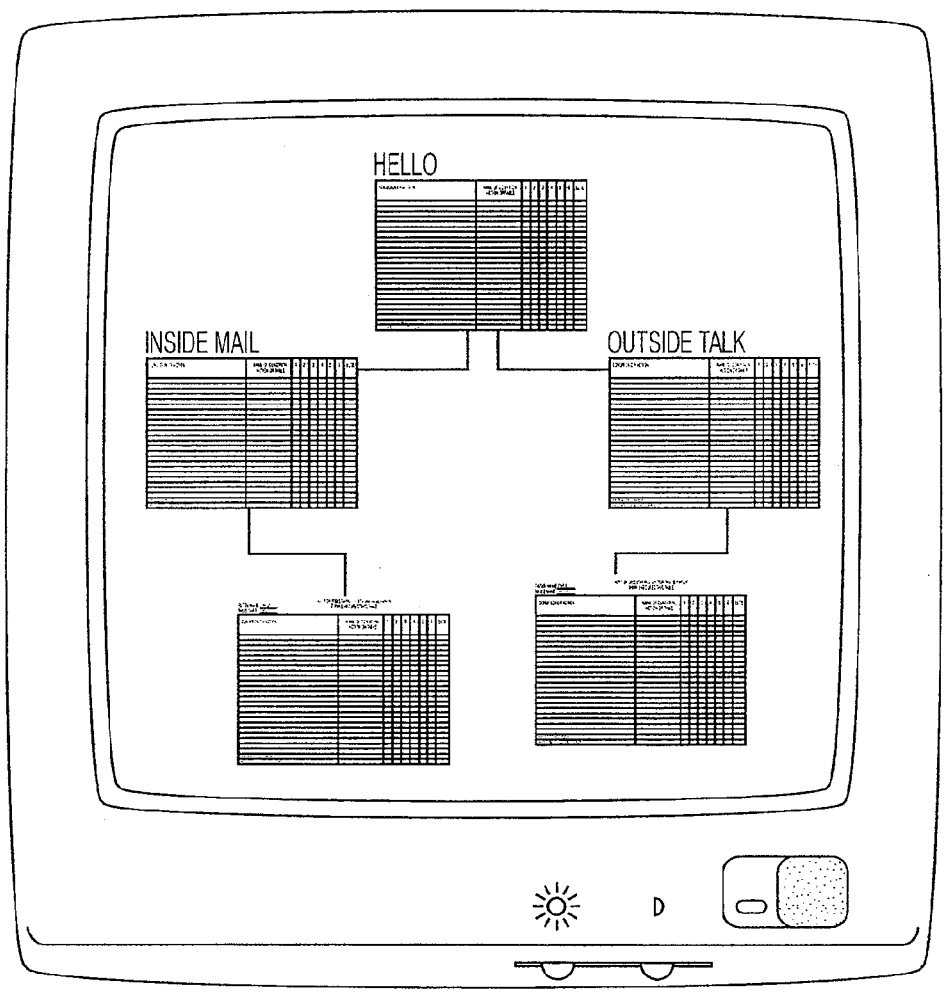
Figures 1, 4, 5:
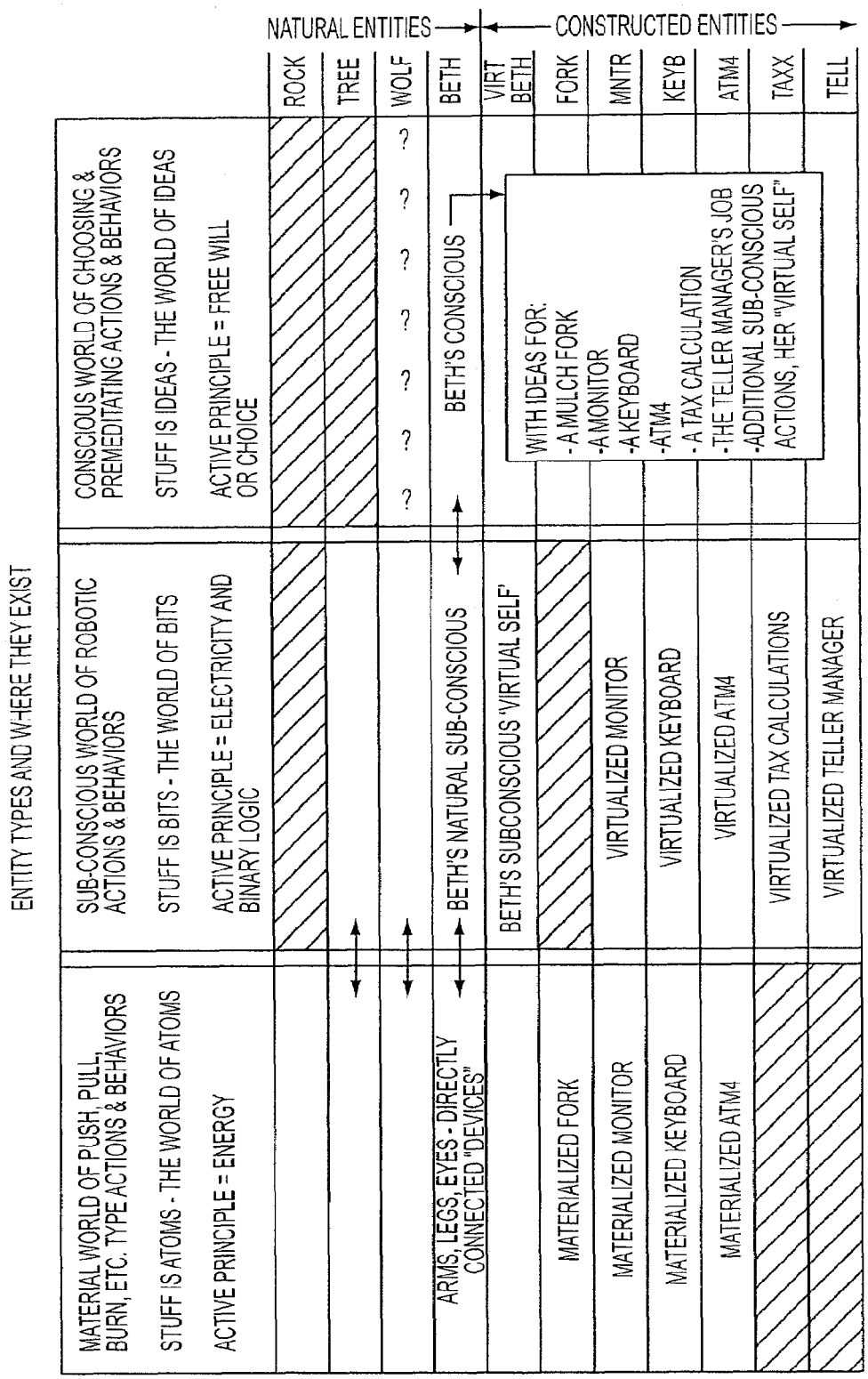
Figures 3, 5:
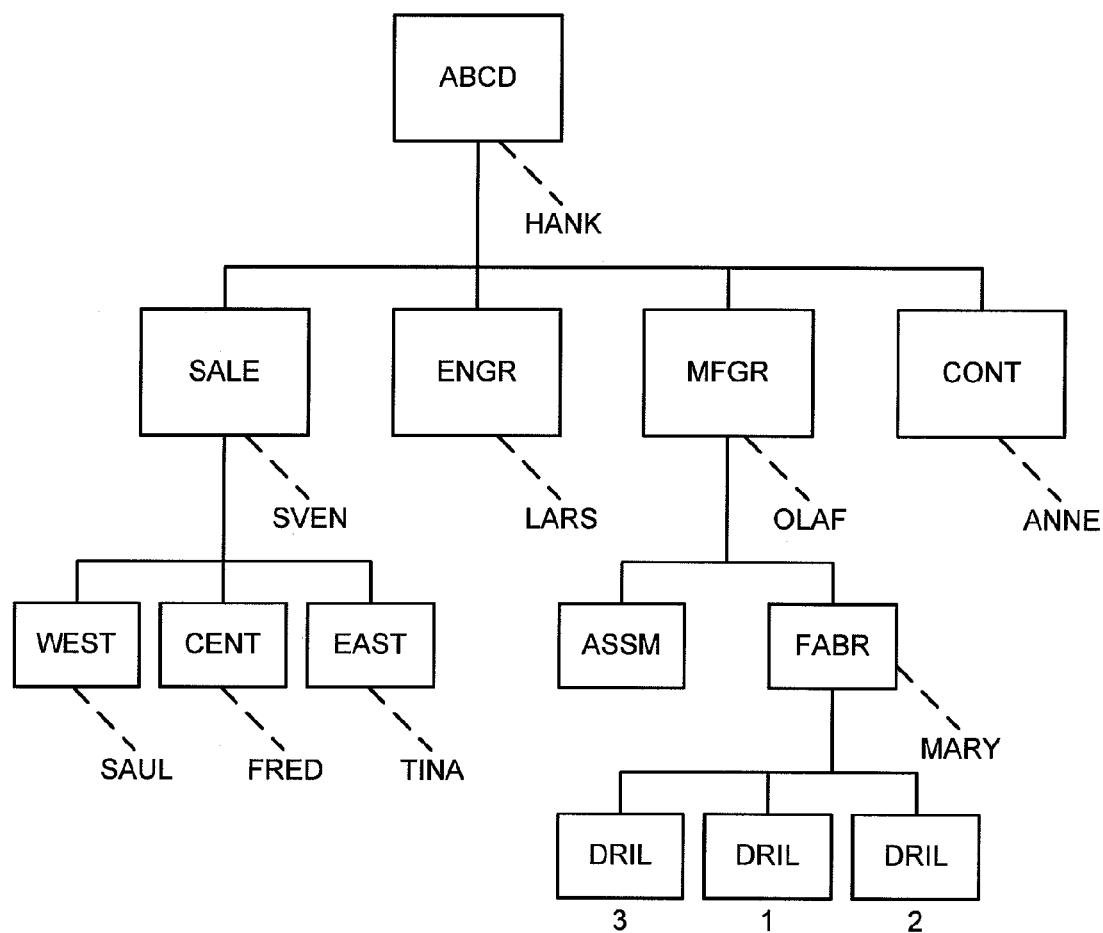

FIG. 3-4 depicts the configuration of the bank's stored program machine, and FIG. 3-5 shows how the attached devices are arranged in the VENT TABLE. FIG. 3-6 summarizes what will happen and shows the relationship between the program (virtual aspect) and the hardware (physical aspect) of each channel entity.

In summary, Hank's question will be forwarded successively to each of the adjoining devices that connect physical Beth back to the stored program machine via its input/output (OTIN PRIM) facility. As each VENT receives a spoken PAKT, it puts its counterpart physical self into proper status to pass through PAKTs, and then forwards the PAKT(s) passed to it. So Beth's non-routine PAKT gets to physical Beth and physical Beth speaks back her response PAKT for her VENT's action.

At 3 pm, if there is no security problem, her VENT probably speaks as:

PRNT B|BETH|answered so fast! How??|HANK|BETH

Enclosing one PAKT within another is like enclosing one postal envelope within another; it forwards the enclosed item to another location. Notice that PRNT B is "close" to Beth (or someone who may alert her). Normally, in the physical world, it is only close or adjoining entities that may speak and listen. VN logic moves data and action to PRNT B's region and that VENT is passed execution.

Assuming this is a new printing job for PRNT B, before it "speaks" the print line to its physical counterpart it must "speak" a protocol that only it knows about itself. The protocol will cause the printer to skip to a new page to begin this new printing job. The PRNT B VENT (the program) looks in its VENT record to determine the location of its physical counterpart, which is CTLR 2 as shown in FIG. 3-4. So it temporarily holds the PAKT to be printed for Beth, and instead, speaks its own protocol:

CTLR 2|bits for new page skip|PRNT B

Every physical entity has "a location or a space" in the physical world where it can speak and listen, called SPLN space. Some devices are called terminals because they provide interfaces for interactions with humans via touch, sight, sound, etc. These are potential SPLN spaces for humans because that is where humans can "speak and listen." But the bit strings that will condition printer B must be spoken to CTLR 2 (PRNT B's "speak and listen space" (SPLN space)) is CTLR 2.

After PRNT B VENT receives an acknowledgment from PRNT B hardware, indicating it is positioned at the top of a clean page, it will speak Beth's PAKT "passing it through" the printer so that it may be seen/read by a person.

VN logic looks up CTLR 2 in the VENT TABLE, moves the PAKT to CTLR 2's region, then passes execution to CTLR 2 VENT. CTLR 2 VENT may need to send protocols to prepare its physical counterpart, the hardware controller, to properly pass through PAKTs beginning with "skip to new page." Possibly it sends a "reset" to prepare the controller, to accept a further PAKT, which, in its turn, will select the proper outgoing line (notice from FIG. 3-4 other CTLR 2 outgoing lines may connect to another printer, PRNT A, and to a drill, DRIL7).

Thus CTLR 2 VENT speaks into its physical counterpart's SPLN space:

OTIN|bits to reset controller|CTLR 2

Following receipt of the reset acknowledgment string from the controller hardware, CTLR 2 VENT looks up PRNT B in its line table, finds the outgoing string to select the correct line to printer B. Once the hardware has been properly conditioned to function as a channel entity, the VENT will speak (or pass through) PAKTs that require the virtual-physical pathway. PRNT B's skip PAKT and BETH's forwarded "answered so fast" PAKT require that pathway.

OTIN performs the same type of exercise to select the correct port, essentially the line to CTLR 2. Thus far each speak interaction has simply moved a PAKT and action to another VENT in virtual space. Each successive VENT is the counterpart of a physical device ever "nearer" to the stored program machine memory or virtual space, yet so far, not a single bit has moved from the virtual world to a hardware device.

OTIN's virtualized portion is a machine-specific primitive program. OTIN is hardware smart, and is one of four primitives included with the universal VN logic, yet specific to the hardware platform being utilized. It knows the bus or port structure, the output/input instruction(s), and the interrupt/disable instruction(s) of the machine. Thus it executes "out" and "in" byte strings transferring bytes or bits between virtualized entities, in memory, and their physical entity counterparts. OTIN's physical portion, or counterpart, is that hardware device which implements the output and input instructions.

For our example, FIG. 3-7 illustrates the byte strings that transit out and in across the virtual/physical boundary as each virtualized self prepares or conditions its physical self, and the end-to-end communication is passed. A VENT interacts with its physical counterpart and vice versa, but never interacts with the physical counterpart of any other entity. Such virtual to physical interaction is termed, more correctly, an intra-action because the transfer of data and action occurs between two counterparts of the same entity. Nobody and nothing gets inside an entity or gets between its virtual and physical aspects, thus preserving the orthogonality of entities. An entity needs worry only about its own behavior, how another behaves or accomplishes its job is the problem of that other entity. Programming and automation are enormously simplified.

VN identifies a series of adjoining entities using the VENT table. Rather than a system, adjoining entities interact to effect the virtual-physical connection. The virtual and physical counterparts of the same entity intra-acting, so that Beth in virtual space passed data and action to Beth in physical space.

VN is completely open-ended. Channel devices may be configured any way the hardware permits, virtualizing the devices with no programming needed. Processors embedded in communications devices, or in robots, are never needed. Utilizing the VENT TABLE, VN assembles, operates, and subsequently disassembles the most tortuous and complex of channels, enabling the interaction of virtual and physical counterparts wherever these may be. Because the adaptation, the VN environment, effects every movement, of data and action, it always stays in perfect context with every entity.

5. Connection Consequences

VN provides numerous channel capabilities. The first capability is the automatic assembly/disassembly of, even tortuous, channels. Beth's virtual self was able to forward data and action to her human self. It did this by speaking (and listening) to a SPLN space, which in turn, was an entity "near" Beth, specifically PRNT B. Unknown to Beth's VENT, VN was able to find, acquire, and assemble a series of physically adjoining entities, i.e., a channel, from the VENT to the human person. This channel remains in existence, that is, the entities remain reserved and assembled until the forwarding is complete, at which time the channel is automatically disassembled. This capability allows VN to connect to any physical person or any physical device, subject only to the fact that it is virtualized on some VN machine somewhere in the network of networks.

Returning to FIG. 3-4, observe that Pete is "near" or sits at a terminal called TERM T, which itself is connected to an IBM System 390. TERM T is controlled by an old IBM time-sharing system called CICS. One may access the System 390 through one of the modems called FONEs by simply dialing the telephone number for one when it is available/free.

VN must find a way through the mess of intervening entities, it must build a channel in order to contact Pete. Channel building occurs either on demand as in the Beth illustration or when a NODEMNGR asks persons to sign on the various people-type terminals (TERMs) for which he is responsible. The latter is called polling: a message is sent to each TERM essentially saying, "please sign on" and the TERM is conditioned to accept keyed information. Every VN node has a person assigned to act as a NODEMNGR (node manger) and it is his/her responsibility to poll terminals, validate sign-on, and update VN tables to reflect the availability of people so that the needed virtual to physical interactions can take place.

Referring to FIG. 3-5, all the devices, previously virtualized on the bank's VN machine, are shown. Assuming a channel is built at polling time, the bank's VN machine manager, actually his premeditated, virtualized self sends out a message to all the people-type terminals for which he is responsible. He asks anyone nearby to sign-on. One such PAKT goes to TERM T:

TERM T|Welcome to VN. Please sign-on|NODE MNGR

VN moves data and action to TERM T, which interacts with its SPLN space, CICS. FIG. 3-8 shows the VENTs and their corresponding physical counterparts, the series of adjoining entities that comprise the needed channel. Some of the resulting strings that cross the virtual-physical boundary will include strings to condition MODM 2 to dial, and then pass through the telephone number for FONE 5, later the S390 sign-on string, or strings if it requires an interaction, followed by the strings necessary to enter CICS, and then whatever CICS command strings are necessary to place a message on TERM T. The VENT, in all cases, knows the strings that will properly "condition" its counterpart and allow data to "pass through". Thus VN enables channels through different devices whether these are radio antennae, conventional computers, etc. For VN to assemble and disassemble the longest, most torturous of channels it is only necessary that each VENT contain the correct conditioning and acknowledgment strings.

After Pete signs on, NODEMNGR updates the tables. Pete's SPLN space is now updated to show TERM T, as shown in FIG. 3-5. NODEMNGR is thus replaced in the VENT STAK of FIG. 3-9. Subsequently, until Pete signs off TERM T, this virtual-physical channel is maintained, or can be instantly reconstituted, by VN.

The second capability is the ability to provide fully floating channels. If there are alternative paths or channels to an entity, VN finds and utilizes such routes, even finding them to speed its own memory swapping, whenever the necessary devices are available and virtualized.

When FONE 5 wishes to condition its counterpart it speaks into its SPLN space, the adjoining device nearer to the VN machine.

MODM|string that is FONE 5's telephone number|FONE 5

VN looks at the table of FIG. 3-5 to find MODM, not a specific modem, but anything that meets the MODM criteria. MODM was the word the Manager of the bank's machine used for a connected device that speaks into, and listens in, common carrier or "telephone" space. So as VN does its repetitious VENT TABLE look-up to find the virtual address of MODM, it compares equal MODMs, and uses the first one marked free. Since MODML was busy, it was bypassed and MODM2 was acquired and marked busy, finding and using an alternative path.

The third capability of VN is that is provides loose and tight channels. VN will retain or drop channel connections depending upon the time value and use possibilities of each channel device. Expensive channel devices are not monopolized by one high-priority task even when an entity is involved in real time/hi-priority actions. VN will accommodate such priorities ensuring that time critical actions are taken, while allowing each/any of the necessary resources (i.e., entities) to be used by other tasks whenever time permits. This is true sophistication, it is achieved without any change to VN's recursive central logic. (If a device is deemed expensive and fast, for instance, it will acknowledge fact after each "pass through" use with the TELL form of SPLN. This means it is no longer listening and is free for other uses where the TALK form of SPLN means it is still listening, waiting and in use by the same conversation and channel.)

The fourth capability VN provides is very fast channels. As PAKTs move through an assembled channel each of the adjoining devices, momentarily but repeatedly, becomes active. This is the general case even though certain simple devices need no attention once they have been placed in operation. As physical channel entities are managed out and in along the pathway, VN machine execution moves up and down through the assembled stack of VENTs as shown in FIG. 3-6 or 3-8. Indeed these VENTs perform like a pushdown stack, only pushed down at assembly time, and only popped off at disassembly time. The STAK TABLE is one of the four types of tables used by VN.

In between times, during operation, action and data are passed between channel entities very, very rapidly, moving from one to the next like a fixed list of branches or jumps. Because channel entities are in global memory each has access to the data to be moved. So, only the action or execution moves. Data is not moved in a VN channel.

This feature extends to the OTIN PRIM and its hardware counterpart. All output and input is accomplished on a gather read/scatter write basis. Data going virtual-to-physical and vice versa is not moved. VN has and needs no I/O buffers. It avoids the lost move time, as well as the memory management problems such buffers cause.

Data originating from all the "speaks" of Beth and the intervening VENTs, and data returned from hardware counterparts to the "listens" of Beth and the intervening VENTs goes directly out from the speak location and comes directly in to the listen location, with no intermediate moving.

While data does not move, execution (action) flicks up and down the VENT STAK by way of a fixed set of jumps. Together these two characteristics enable a VN channel to operate at blinding speed.

The fifth capability provided by VN is packaged protocols. Entities interact without using intervening protocols like telephone numbers and the like. Actually protocols must be issued to condition the physical entities comprising the channel. But, within VN, they are packaged with, and issued by, that VENT which is the virtualized counterpart of the physical device.

For example, FONE 5 shown in FIG. 3-4 is the VENT counterpart of the modem attached to the IBM S390. When the manager of the bank's VN machine decided to add FONE 5 to the machine's configuration, the same way any device is added, he virtualized it. Following naming conventions established for this machine, he entered its name, FONE 5. Obviously his virtualized self is premeditated in this regard so it prompted and aided his entry. Then he entered the manufacture's tray of protocols, again prompted. Essentially the manufacturer's tray includes speak byte strings, to condition the physical modem, and corresponding listen strings, or acknowledgments, expected back from modem hardware. Typically the conditioning string, to acquire the modem, is its telephone number. Corresponding to it would be one of two expected acknowledgments, a string indicating the modem is busy and could not be acquired or a string indicating the modem is acquired and part of the channel. In any case the telephone number is packaged with the telephone and no one else need know it. The only party that ever needs to know, or even look at, protocols is the device manufacturer. They should be included as part of his packaged product.

Almost all devices, automated teller machines, modems, automated drill presses, etc. are simple to operate, requiring only the speak listen strings specified during device design.

The sixth capability VN provides is remote device operation without the need for embedded processors. The examples have shown the software, necessary to condition and drive a physical device, as a resident VENT in a VN machine. CTLR 2, PRNT B, and ATM4 were each controlled by their virtualized counterpart. However, in the conventional computer world embedded processors have been touted as the answer. Interactive TVs, home security systems, automatic drill presses, automated teller machines, even modems among others, were to benefit from these miniature marvels.

Embedding a processor protects the device from snarled communication systems. On the one hand the software can deal with the protocols of the various communications systems and shells. On the other hand it can precisely condition and control itself. In between, it can translate and negotiate the differences. If a manufacturer provides new software and embedding methodology, a future change in communication systems will not force discard of a now-obsolete device. Costs and complications resulting from the processor, special software, unique embedding methods, etc. are downsides.

In contrast, VN permits a natural and general handling for any entities by enabling the virtualized counterpart direct and complete powers of control. Because devices are such simple entities, the manufacturer's tray of protocols is all VN requires. It recognizes VENTs lacking procedure, and instead, passes execution to a VENT-like module, VNUL of FIG. 3-9. VNUL drives the physical device using the manufacturer's constants.

Suppose ATM4's VENT receives an unexpected, incorrect acknowledgment. Usually this means the device is broken so the VENT (or VNUL performing in place of it) may try some resetting and restoring sequences exactly as an embedded processor might do. If this fails, then a VENT may speak directly to any other VENT. Perhaps the manufacturer included in his tray the name of the individual (Mary) most expert in this particular problem and our device VENT will speak:

MARY|bad acknowledge—10's dispense|ATM4

Hopefully Mary will affect a cure for the 10's dispenser without leaving her Florida beach chair. There are other avenues as well because VN networks all entities into a community. Conventional, separate, provincial, and little systems and subsystems never connect like this so their value to organizations is limited.

For reasons like this, VN's remote device operation may trump embedded processors. However, VN will just as easily talk to embedded processor devices. But VN's entire residency requirement, preferably less than 100K of memory, is probably less than the operating system residency of the embedded processor.

VN machines are all peer nodes. A communicating entity within a VN machine (node) utilizes channels, unwittingly of course. The node acts at once as a router and/or a switch, acting to handle packet by packet and/or real time, and simplex and/or duplex, communications. Extensive and flexible configurations require only that needed entities be virtualized.

VN machines are not especially constructed but identical virtual environments. Configurations are not fixed, they are not dependent upon manufacturer supported hardware or software. Rather configurations evolve as entities are virtualized. Only apparent differences may be perceived due to the type/number of entities virtualized or the type/number of interactions moving within, or through, a particular machine. All VN machines are the same, that is, identical peer nodes.

The natural consequence of a design, pursued for far different reasons, leaves VN as a formidable communications machine. All these capabilities are found simultaneously in one place, in VN.

6. Summary of Adaptation

In VN, a stored program machine is adapted to provide a virtual environment for programs. The adaptation consists of a compact, ruggedly simple, highly recursive logic which, early on, will be considered integral with machine hardware. Within this environment, any program may interact with any other program, located in a given machine or in any other similarly adapted machine. Such interactions are analogous to a "speak-listen", they pass both data and action. All interactions are direct and immediate, and protocols are never needed.

Programs are viewed in a particular light, namely, that each is a counterpart, a different aspect, of an entity such as a device or a person. A connection is made between a program and its material counterpart by means of a channel, the channel consisting of other programs together with their material counterparts.

Using a VN assembled channel any physical device or person may interact with any other physical device or person, located anywhere, doing so immediately, directly, and without protocols.

Additionally, because every entity's interaction is conducted through a program counterpart, the program is positioned to intercept and handle part or all of the action. In this way any entity is partially or wholly automated.

7. Program Structure

Because speak-listen is a repetitive action, occurring millions upon millions of times, the supporting logic of the adaptation must be simple and spare. FIG. 3-9 shows adaptation logic modules in dark lines while the VENT modules are shown in light lines. Modules above the dotted line are specified and implemented as decision tables (DT-BLs), while those below are designed and encoded conventionally.

When a VENT wishes to act or interact, it speaks as shown above and execution is assumed or taken by the TAKE module. TAKE validates the PAKT, and if this is the first speak of a conversation, it looks the listener up in the VENT table, finding its virtual space coordinates. The GIVE module receives execution, and in turn, passes that execution to the correct "listener" VENT, thus supporting a VENT's wish to speak which is equivalent to supporting all VENT actions necessary to mimic its physical counterpart.

As described above, the passing of execution or action is apparently simple, but the passing of data is more complicated. While one entity may choose to speak, the other may not choose to listen. Just as in the physical world one may hear a noise from another but allot no mental (brain) space for what that other is saying. The same is true for our virtualized selves. The listener must have virtual space allocated for the specific speaker's PAKT whether it is one word or, at the speaker's choice, the entire encyclopedia. Below describes how a virtualized person keeps different topics, and the individual conversations within those topics, separate and distinct. Orthogonal VN ensures this condition exists before passing action to the listener.

Space allocation, or memory management, has been the most difficult and crucial problem for operating system software. The greater the number of active tasks, the greater the number of needed program modules, and the more difficult the memory management/storage allocation problem is.

Historically, for an operating system of any generality, one might observe that this problem was not solved, but compromised. Program size was controlled. A unit of work was accomplished by running several smaller programs one after another. Alternatively, a limit was placed upon the number of simultaneous tasks, since each task required its own resident data structure as well as the task program.

Without controls on program size and limits on the number of simultaneous tasks, designers believed the stored program machine would be burdened. Excessive memory swapping, a condition called thrashing, was the problem to be avoided. So program size and the management of memory, by an operating system, was balanced against the allowed number of tasks and the management of those tasks. Larger programs meant fewer simultaneous tasks and vice versa. Memory management was viewed as interdependent with task management, snarling the logic of one with the logic of the other. Generally, the computer culture assumed such interdependence. Hence the need to compromise was an obvious, self-evident truth.

A VENT program cannot be infinite in size, nor can an infinite number of tasks (with their associated data structures) be accommodated because there is not an infinite amount of disk (real) storage in the world. But, VN is designed without arbitrary, up-front limits. To the contrary, every aspect is designed to be independent. Consequently, tasks and program size are strictly orthogonal. For example, a single virtualized node may contain many VENTs, and will likely have many tasks running at every point in time because each speak creates a separate task for that node. The number of potentially simultaneous tasks is high. However, a node will reach its operating limit much sooner since some percentage of interactions involve VENTs on other nodes. A reasonable limit is some multiple of the useable channels or pathways to/from the node. A program entity's space will be approximately 64 terabytes.

VN creates its own virtual space with its own coordinate system. For example, a VENT in the VENT TABLE contains a "pointer" to its region in virtual space. The "pointer" is given in virtual space coordinates. VN maps this virtual space back, via logic modules called PRIMatives (see FIG. 3-9), to the stored program machine memory as presented through the hardware memory-mapping architecture.

If too much virtual space is utilized or written, the stored program machine manager's VENT will be notified that disk limits are approaching. This is a problem of virtual space size only. On the other hand, if too many simultaneous "speaks" occur, or too much space swapping is required, the speed of the machine could slow.

These two situations were contemplated, and viewed as independent from one another. But neither was "solved" or compromised during the design of the adaptation. They are properly and easily solved later, when and if they occur. If space limits are approached, disk capacity is added. If throughput or response time degrades, the hardware platform is replaced with a faster, larger one, or the work is split among several different virtualized nodes. VN makes configuration changes such as these very easily.

If an Intel 386 machine is used as a platform, then there will be only 64 terabytes of programmer memory with hardware assists to map it back to 4 gigabytes real. VN provides just enough virtual space for devices, but for person entities it will provide approximately 64 terabytes. Thus, premeditated behavior of a person may grow greatly over time, independent of any other change in the physical or virtual worlds.

Large space makes additional premeditation very simple. And it is easy for the programmer to encode. He/she encodes only in-program instructions, but no program or I/O calls. He/she encodes only "speaks" and passively assents to "listens."

Returning to FIG. 3-9, note that the VNUC module is not a VENT. But, it is written as a VENT and has the identical speak-listen powers of a VENT. VNUC handles virtual memory management, at the logical level, ensuring the appropriate regions of virtual space are present in machine memory at appropriate times.

Memory management must transit hardware addressing logic, memory boundaries, and then secondary storage, before all is prepared for PAKT movement and the passing of execution to the listener VENT. This requires the issuance of machine-privileged instructions accomplished by the four short PRIMitive routines shown in FIG. 3-9. They exploit the machine to the fullest and make it conform/submit to the needs of the VN environment. In moving VN to a new type of hardware platform, only these short routines need to be re-written.

The DRVR module of FIG. 3-9 is the decision table driver, the run-time piece of code that passes execution. Execution is first passed to the series of tests in a decision table (see FIG. 3-10). DRVR saves the yes/no test outcome from each and then determines the appropriate "rule" from all the outcomes. After that DRVR directs execution to each action in sequence as indicated by the rule.

All VN shown above the dotted line of FIG. 3-9 is specified via decision tables and will be encoded as such. When execution is passed to the TAKE module, for instance, actual execution is passed to the DRVR with a pointer to the TAKE DTBL. The DRVR ensures all correct tests and actions are accomplished.

The resultant independent pieces of logic mean that one may be changed without, unwittingly, changing any other. Improvements or fixes are easy.

The data structures used by the adaptation are simple tables. Four tables are maintained at the logical level, two of them have already been discussed. A simple virtual to (programmer's) memory table, in combination with the usual hardware memory mapping tables, are also used.

D. A Perception of the World

This section describes a practical way to perceive the world in order to understand how VN fits into and complements it.

1. The Human Entity Perception

VN communicates directly to a virtualized person. No telephone numbers and mailbox addresses are needed since VN remembers only the person's name. In some cases, the virtualized person responds without even disturbing its real world counterpart, the conscious human. To accomplish this, the person should be present within the virtual world.

Today's telephone and computer/internet systems don't have persons within them. They connect only devices. Thus, it is necessary to "call" the person from his real world location, and the communication goes to telephone numbers or to an internet mailbox.

Understanding how to place a person within the virtual world requires an understanding of the makeup and operation of the human entity.

Prior attempts to program human clones or robots have proved painstaking and costly. Millions upon millions have been spent on artificial intelligence, thinking systems and the like with little positive result. The reasons are obvious. The human is complex, is devious; he harbors love, hate, remorse, sympathy, revenge, humor, etc. There are ulterior motives in his actions. Often what he says has nothing to do with what he means.

VN deals with a part of a person, but not with emotions. VN programs or virtualizes any activity or behavior of the human personality that can be off-loaded from the conscious, i.e., subconscious or routine activity or behavior, being handled by a virtualized self, a program entity.

For example, imagine a four-year old trying to tie his shoelaces. His little hands and fingers do not function perfectly as he tries to follow the teacher's emotions and explanation. He does this several times following the teacher while producing various versions of a knot.

Now imagine it is thirty years later. The former child has finished his workout and has taken a shower. As he talks baseball to a friend, he unconsciously reaches for a shoe, puts it on and laces it up. The second shoe is similarly automatic, until a lace breaks, requiring his conscious attention. He drops out of the baseball conversation momentarily as he looks down to see how the problem can be rectified and then immediately returns to baseball and automatic knotting.

Notice the tying activity went from conscious as a child, to unconscious or sub-conscious as an adult. Then, when a problem or when something other than that which was planned for occurred, tying again became a conscious activity. Within the normal human it seems that learned procedures are treated as sub-routines, off-loaded from the conscious self.

As discussed above, a stored program machine handles any problem, any situation that is understood and programmed into it ahead of time. Premeditation is that beforehand exercise by which humans consider a situation and decide, or learn, how it should be handled. Premeditation establishes or programs later subconscious behavior.

For example, suppose a payroll manager wants to validate the completeness of employees' time reports, collecting missing information from the employees, and then calculate the gross pays. The payroll manager has thought about the job ahead of time, specifies the desired procedure, and passes the work to a subordinate. The work is off-loaded from the manager's conscious self.

If the subordinate finds the activity routine, being human himself, he will quickly relegate it to his subconscious, freeing his conscious time to dream of an upcoming golf vacation. If, on the other hand, a situation arises for which the manager provided no specifications, then the subordinate will bring the problem back to the manager who is the conscious self for this activity.

In both examples, premeditation of a situation allowed a person to off-load conscious activity. However, situations not premeditated caused analogous equivalent returns to conscious level activity. Delegation is one way to characterize this off-loading and return of responsibility. It is the thinking/conscious part of the human which makes the delegation and accepts back the unspecified or out-of-bounds problem when it occurs.

Premeditation and placing some action or behavior in the subconscious allows the subconscious to accomplish much without bothering the conscious self. Similarly a virtualized self is a very valuable part of you. Since your virtualized self acts for you, it is seen as you. Words, actions, and overall behavior define you and your personality. Actions taken by your virtual counterpart are viewed as your actions. VN may virtualize any/all actions or behaviors that can be premeditated, and handled subconsciously or those that may be delegated to a subordinate.

2. Entities in General—Perception

Human persons exist and operate at three levels of existence or in three worlds: (1) a conscious world of thoughts (ideas); (2) a subconscious world of programs (bits); and (3) a physical world of material (atoms). The human, via his brain and nervous system, apparently passes action through all three levels at will, for example: (1) wishing to go up the steps (conscious); (2) engaging the eye/leg coordinator routines (sub-conscious); and (3) doing the eye scans like a transducer device, and the leg movements like a mechanical device, to go up one step (physical)

Within VN there are intra-actions, between the physical and virtualized counterparts of the same device or same person. Similarly, a human passes action via the network of nerves an intra-action between the sub-conscious and physical counterparts of that same human person.

FIG. 4-1 depicts four natural entities (the leftmost four) and the levels of existence in which they reside: (1) a rock exists only at the physical level, it is an entity but has no counterpart at different levels; (2) a tree lives at both the physical and subconscious levels because it does "act". For example, it grows toward greatest sunlight, and it reacts, reducing leaf surface in response to a dry spell. It has physical and subconscious aspects, the latter behaviors likely stored in its genetic codes, routines pre-meditated by evolution; (3) a wolf, likewise, lives in both physical and sub-conscious worlds (with marvelous pathways between the two); and (4) Beth exists at all three levels. In addition to genetic coding, and learning that might be considered simply repetitious or experimental, she is able to decide/choose to behave in a certain way. Her sub-conscious aspect seems to execute sub-routines inherited, learned, or deliberately chosen and premeditated. These routines drive the fingers, mouth, and eyes, the mechanical devices and transducers of her physical body, so presenting her actions and behaviors. Her conscious space may contain ideas that are entities, independent things that exist in her mind. In Beth's conscious space are two original ideas, an idea for an addition to her subconscious behavior, and an idea for the behavior of The Manager-Teller Operations.

FIG. 4-1 also depicts seven man-made or constructed entities (the rightmost seven) in their correct places in the three levels of existence. These are inventions, the materialized, physical level entities and the virtualized, sub-conscious level entities that earlier existed only as ideas in the mind of their inventors, i.e., at the conscious level. Two of them are Beth's original ideas, her inventions.

Beth's virtualized self exists at the same level as her natural subconscious and may contain some of her premeditated reactions and behaviors. These behaviors are in addition to those of her natural subconscious. Her virtualized self lies within the virtual space provided by a stored program machine, which space conforms exactly to the space of the sub-conscious (unconscious) level of existence. Beth's natural subconscious speaks and listens to (controls) the physical devices of her person, i.e., the mechanical devices like fingers and legs, and the transducers like eyes and vocal cords. Beth's virtualized subconscious speaks and listens to any/all other VENTS in the world. Her natural subconscious returns the problem to her conscious self via the nervous network of her body when an unanticipated situation arises. Analogous actions are taken by her virtualized self, but here the problem is returned to her physical self, perhaps her eyes using a monitor or screen, thence through her in-body network in order to reach her conscious self. The key notion is that virtualization extends a human's subconscious capabilities, and enables immediate and direct interaction with every other virtualized entity anywhere.

A mulch fork exists in physical space only. Action is passed to it, through its handle, by use of a person's arms or by asking someone else who happens to be near the fork to turn the mulch.

Ideas for a monitor, a keyboard, and an automated teller machine may be materialized (constructed and placed) into physical space. The counterparts of these same entities may be virtualized into virtual space. The effect of virtualization is to allow every entity to interact with every other by virtue of the network.

A tax calculation, an algorithm, is a conceptual device because it has no physical counterpart. A such it can be virtualized and so placed in the sub-conscious level.

The Manager of Teller Operations, a responsibility, is a conceptual person because it has no physical counterpart. It can be virtualized and so placed in the subconscious level. This fact is of greatest impact because purposeful communities™, or organizations, are made up of conceptual persons.

Each VENT has a counterpart, a complementary part of itself existent in the conscious or material levels. Although almost any entity may be virtualized, the four most common types of virtualized entities are: (1) a human—the subconscious activities of that human may be extended or amplified; (2) an implement—the activity of that implement or tool may be automated; (3) a responsibility—the activities defined within that responsibility may be made unconscious, automatic; and (4) an algorithm—the actions of that algorithm may be transferred from a human to a stored program machine. See the entity summary of FIG. 4-2.

The idea of conceptual persons, the building blocks of organizations, will be further explained, and the idea of agency, of one entity acting for and in the name of another entity, will be introduced below.

3. Conceptual Persons and Agents

The Manager of Teller Operations is a conceptual person, but different from Beth. She was appointed only to act as, and in the name of the Manager of Teller Operations. Her successor in that role would wish to assume his/her responsibility with all the pre-meditated actions, records, and histories of interactions intact. Besides, Manager of Teller Operations is not all there is to Beth. Beth has other facets to her personality like daughter, sports fan, and even Secretary of that famous Investment Club.

So Beth and Manager of Teller Operations are separate entities. Beth (and in this case, her boss) may pre-meditate the behavior of the Manager of Teller Operations describing the various situations and the actions to be taken for each. Possibly, over time, they will pre-meditate and have encoded 90% of the situations and actions, the workload handled by that Manager. If so they will have automated 90% of the job.

If a situation is presented to the Manager that has not been premeditated and encoded, then the Manager of Teller Operations would forward the situation to its physical (and so conscious) self, its counterpart. But The Manager of Teller Operations is a conceptual person, a virtualized idea, it has no physical or conscious self. VN mimics the agent role of the natural world, that is, the role played by Beth. She was assigned or appointed to the responsibility, so the Manager's VENT record carries Beth as agent. As a result, the Manager's virtualized self simply forwards the uncontemplated situation to Beth (to her virtualized self). She is the entity assigned to act for, and in the name of, the Manager of Teller Operations. As before, Beth acts consciously. Depending upon the type of terminal she signed onto, she may either say into the microphone, or type into the keyboard, the responding action.

Any conceptual person handles "unfamiliar" situations by forwarding the problem to its agent VENT. The forwarding is accomplished by the same speak-listen interaction. VN uses the same recursive engine to enable the interaction. VN senses the different communal role implicit in this interaction. In the normal speak-listen both data and action are transferred from speaker to listener. Here the listened data and the spoken response belong to, and are in the name of, the Manager of Teller Operations. Only the action is moved to Beth.

Similar is the role of a lawyer or accountant. He/she is authorized to act as an agent, on behalf of the client, when the IRS questions. The incoming IRS query and the outgoing response belong to the client because the conversation is between the IRS (a conceptual person by the way) and the client. The client's accountant acts on his/her behalf.

Device entities neither need, nor can they perform as, agents. Both physical and conceptual devices are designed for a specific area of use, and the designer must contemplate every eventuality, every possible situation, within that use. If an uncontemplated situation occurs, outside the intended area of use, the device may break. Here the user is at fault for trying to use it outside its intended range or limits. But if an uncontemplated situation occurs within the intended area of use, the device is regarded as defective and the designer is at fault.

Stated differently, a device's use area is precisely prescribed while its design handles 100% of the possible situations. Thus, a device is complete in the sense that all possible situations have been contemplated. It needs no agent for uncontemplated situations.

VN's person type entities are quite unlike devices. They too, handle 100% of the situation, but their area of use may be poorly defined or undefined so a variety of situations may occur which could never be contemplated beforehand. For this reason, if a person type entity is not a living human, if it lacks a conscious, human counterpart, it must have an agent. Such is the case with John Doe, deceased. No longer is there a conscious, living counterpart. Hence, John Doe deceased must have an agent, an executor. The same is true for the conceptual person, the Manager of Teller Operations. There is no counterpart for the manager so an agent must be assigned (or the position of Manager must be filled).

Because VN guarantees there is always recourse to a conscious human, any situation can be handled by person type entities, either automatically in the premeditated program, or by recourse to the conscious level person.

Referring back to FIG. 4-2, here is a summary of entity types. A device deals with and responds to every situation within its areas of use. It is a complete and closed entity. Its every aspect is engineered ahead of time. A person deals with and responds to every situation that comes to it. If it is a conscious person, or has recourse to a conscious person, then it is a "becoming" a open entity. There is no need to engineer every particular ahead of time. This type of entity can deal with any eventuality if and when it occurs.

Herein lies a great strength of VN. It is the first metamorphosis of the stored program machine that offers one the true power of delegation. Delegation means giving another the responsibility in an imperfectly prescribed area where all the possible situations and problems have not been thought out.

With current computers automation requires thinking out every detail ahead of time and programming it into the machine. But with VN's persons, automation requires only that you delegate loosely described responsibilities. That is why it is so easy, initially, to bring VN into organizations. All that needs to be done is virtualizing the responsibilities. Then, as time goes on, it is easy and natural for managers to automate the different parts of different responsibilities according to the then existing priorities.

VN does not incur systems complications. Premeditated instructions to responsibilities A are exactly the instructions a person would give to a person handling the work for them.

Two final notes are worthy of mention here. First, since the virtualized environment supports an authentic agent role, persons may choose to employ one or many agents, like the accountant, even when agents are not necessary. Second, although any conceptual or physical person may act as agent for any other conceptual or physical person, the entity at the end of the agent chain (no matter how long it is) must be a living, human person (existing at the conscious level).

4. Summary of VN's Perception of the World

The world is perceived, or a model of the world is constructed, as three levels of existence, i.e., conscious, subconscious, and material/physical levels.

The stuff of the conscious level is ideas. The active principle that drives this level is human life as characterized by choice and free will. As far as we know only humans exist at the conscious level. Effects of human activity here are seen in the next lower level.

The stuff of the subconscious level is bits or information. Portions of information are interpreted as routines or programs. The three active principles that drive this level are: (1) a life principle that executes any routine provided by genetic coding; (2) a human life principle that executes any routine provided or modified by the conscious level, after thought, practice, learning; these are learned or premeditated routines; and (3) an artificial principle (electricity and binary logic) that executes any routine provided as an encoded program for the stored program machine, these are premeditated routines. Living things and virtualized things exist at the subconscious level.

The stuff of the material level is atoms. The active principle that drives this level is energy. Physical or material things exist at the material level.

The perception points to conceptual entity types, ideas that never have a counterpart at the physical level. A conceptual person equates to a responsibility and a conceptual device equates to an algorithm. Whereas other ideas, when materialized, produce counterparts at the physical level, i.e., a physical device, conceptual entities when virtualized, produce counterparts at the subconscious level only.

The existence, of conceptual persons, forces a further insight. If the conceptual person is automated, what happens when an unforeseen situation arises? It may not break, as a device does, so it must pass action to another person entity, an agent, who is empowered to act for, and in the name of that conceptual person. The subtle agent role is mimicked and supported by VN. So any person type entity may have agent(s) and may be agent for any other person type entity(s).

E. Orthogonality and Purposeful Communities

This section considers how people use the principles of engineering science to arrange devices forming machines, and how they use the principles of management science to arrange people forming organizations. VN supports and enlivens both kinds of arrangements.

The most important principle concerning such arrangements, from the viewpoint of either management or engineering science, is the principle of orthogonality. Unlike the computer systems of the last 50 years, the entities of VN conform to this principle. VN fits with the rational arrangement and employment of men and machines.

Entities on the left of FIG. 5-1 are natural entities while those on the right are man-constructed entities. Constructed entities originally emerged as ideas, as entities at the conscious level, in the minds of men.

Man materialized ideas (into things made of atoms) at the physical level, and since the ENIAC, virtualized ideas (into things made of bits) at the subconscious level. Both of these constructs originated with the ideas of men. FIG. 5-1 shows them as physical level and subconscious level constructs.

VN allows any natural or constructed entity to be virtualized, placed into an artificial existence at the subconscious level. Therefore, a natural entity like a physical person, or a constructed entity like a conceptual person, may be virtualized.

Virtualization consists of defining an entity's counterpart, a program, into the VN environment. The VN environment equates and extends the real world's subconscious level. The consequences of virtualization are: (1) the virtualized entity may interact directly and immediately with any other virtualized entity; (2) the active principle of electricity and binary logic drives, or enlivens, the preprogrammed actions and behaviors of the now virtualized entities; and (3) the behavior of any entity may be premeditated and virtualized without regard to any other entity; this is the orthogonality property of virtualized entities.

VN also automates the actions of communities of entities. Persons and devices, virtualized, and in community with other virtualized entities, act and interact, driven by a VN that mimics the natural world. Entities are arranged into special types of communities in order to accomplish larger purposes.

1. Purposeful and Orthogonal Arrangements

Consider the following words: (1) function—the action or operation of an entity; also, the action for which an entity is especially fitted; and (2) responsibility—the function for which a person is accountable, responsible or burdened.

Engineers design a device to perform a function. Analogously, managers design a responsibility to handle a function and assign a person to be accountable for that responsibility.

Consider the following words: (1) machine—a purposeful arrangement of interacting, conceptual or physical devices to handle a complex function; (2) organization—a purposeful arrangement of interacting conceptual persons to handle a complex responsibility; and (3) purposeful community™—a purposeful arrangement of devices and persons to handle a complexity of functions within a complexity of responsibilities.

The design of a device must be complete and exact at its design time or else the device will fail. Devices do not deal with out-of-bounds or uncontemplated situations. The design of a conceptual person need not be complete or exact at its design time. If and when a conceptual person encounters an out-of-bounds or uncontemplated situation, the conceptual person simply refers it to another person, an agent, for resolution and appropriate action.

Within an organization a responsibility may be loosely designed and delegated, but within a machine, a device must be exactly designed and inserted. The distinction is important. It makes the design and delegation of responsibility a less exacting, but enormously effective way to unload one's problems and functions.

The hypothetical examples shown in FIG. 5-2 illustrate the analogous design principles used for constructed entities whether these be responsibilities or devices of either type. Each constructed entity has: (1) a purpose or objective, (2) a limited or bounded area of operation, and (3) the capability, power, or authority necessary to accomplish its purpose.

Engineering Science concerns itself with the design of machines to handle complex functions, whereas Management Science concerns itself with the design of organizations to handle complex responsibilities. But each science utilizes similar design principles.

Because entities do not exist in isolation, one principle of good design holds for all constructed types. An entity's orthogonality must be protected. Purposes, areas of operation or action, and authorities or powers to act should be distinct, separate, non-overlapping. Only in this way are entities independent from another; only in this way may the behavior of one be altered without affecting the behavior of others.

When the principle of orthogonality is violated for devices, machine breakdown occurs. When it is routinely violated in organizations a bureaucracy, an organizational sickness takes hold.

The following provides a step-by-step explanation of how VN aligns with and supports the larger purposes of organizations and machines, i.e., purposeful communities™.

2. VN's Congruency with Purposeful Communities

Step 1: When starting a purposeful activity like a business or a club a separate entity is created. That entity will act like a person, calling board of director or club meetings, hiring people, allowing people to join, choosing courses of action, etc.

So it is logical to virtualize a business or club as a conceptual person, the responsibility identified as that particular business or that particular club. This places a counterpart of the organization into the virtual world. If desired, the conceptual person can be incorporated, becoming a legal person recognized under the law, and may then sue or be sued. The organization could be named, perhaps, The Springfield Flower Club or the ABC Corp.

Step 2: The conceptual person who virtualizes the organization needs an agent. Any physical or conceptual person, previously virtualized, may be assigned as agent. Very likely the agent for this first/overall organizational responsibility will be, the person we call, the CEO.

Step 3: many routine organizational and normal activities can be premeditated, and automated, using the organization's virtual counterpart, the conceptual person. Perhaps customers speak to the organization to place orders, to find the shipping date for earlier ordered items, or to see if an item's special discount is still in effect. If such talk occurs via a telephone, the automated organization might react in similar fashion to the automated telephone answering of today. Press 1 to place an order, press 2, etc., or hold for a (live) human being (in this case probably the CEO), each piece of data being entered following a voice prompt for it. If such talk occurs via a keyboard/monitor, then the interaction is somewhat different simply because the whole order format may be placed on screen to be filled in at once, without necessitating separate prompts.

Step 4: As the organization grows (or if it was mature when first virtualized) the overall responsibility may be broken down into sub-responsibilities, for example, as depicted in FIG. 5-3. It is no longer effective for one person to oversee all activities. In this example our CEO chose to use his ABC Corp. authority to design four sub-responsibilities, hopefully following the principals of orthogonality. Sales, Engineering, Manufacturing, and Controller are the sub-responsibilities.

Step 5: VN is congruent with organization. At the outset VN allows a hierarchical relationship or a peer relationship. It enables separate conceptual persons like Sales, Engineering, etc. to be sponsored and virtualized by a senior responsibility, in this case by the overall organization, ABC Corp. Each sub-responsibility requires an agent be assigned. If no human is yet available for the Manufacturing responsibility, then ABC Corp. may temporarily assign itself, or CEO, or any other conceptual or physical person as agent for Manufacturing.

Because ABC Corp. is hierarchically senior to Manufacturing it will always retain power to assign different agents, to premeditate its behavior, and to remove Manufacturing altogether. Notice this is the exact power a senior manager would like to retain even if the junior is trusted and respected.

But a good senior probably hopes his delegatee, the agent of Manufacturing, will automate that responsibility, will handle the non-routine activities himself and bring for resolution only those unclear situations which may affect or possibly be in the jurisdiction of other responsibilities.

Finally, if and when he trusts his subordinate, there is one other power the senior may wish to delegate. He may allow the junior to further breakdown his responsibility, into sub-responsibilities, exactly as the senior did. The junior can thus use his full managerial powers to design his own sub-organization. And VN supports this kind of hierarchical, delegator/delegatee relationship. FIG. 5-3 shows the further breakdown of Manufacturing into a Fabricate group and an Assembly group.

Step 6: Premeditated behavior may be placed in a responsibility, so automating a portion of the behavior or activity of that responsibility. The agent/assignee for the responsibility, or the senior that broke out the responsibility, are the only ones empowered to premeditate or otherwise effect the automatic behavior of the conceptual person, effect the automation of the responsibility.

Step 7: No matter how beautifully the organization is structured, and how well responsibilities are spelled out, delegated, and automated, inevitable change will cause managers to want to rearrange the organization and reshuffle the responsibilities. Premeditated or automated behaviors of different responsibilities are easily adapted and shifted about.

In the first place, restructuring is especially easy if the automated behavior was accomplished using VN's decision table facilities. DTBL's clearly separate the different situations and their subsequent actions. Without re-encoding, DTBL logic can be sliced, split, moved, and reconstituted elsewhere. The orthogonality property is evident in DTBL logic. Tests, to determine the situation or case, the different cases themselves, the actions to produce the premeditated behavior, as well as the program routines corresponding to each test and each action are each independent, separate and distinct. So VN's DTBL table management facility makes it easy (though not trivial) to split, slice, move, and reconstitute the premeditated behavior of organizational responsibilities.

In the second place it is quite likely that organizational restructuring will breakout and re-delegate responsibility according to already existing contexts, subjects or categories. For example, all Project 5 activity placed under responsibility X, all customer contact and associated information (except for plastic products) placed under responsibility Y, and so forth. But this is breaking out an (arbitrary) view, originally established for the responsibility now being reorganized. A view is a very specific, separate part of the responsibility and is easily moved to a different responsibility. Again, organization charge is greatly eased, but not trivialized.

3. VN's Beautiful Conformance

VN conforms to, supports, and faithfully mimics, real world complexes of humans, implements, responsibilities, and algorithms. Because the mimicking is so thorough, one cannot distinguish whether actions originate from the premeditated virtual self or from the real self.

Compare VN to computer systems that almost never reflect, or conform to, any real world organizational structure. Typically, when we speak about reorganizing we mean only the people move to different boxes, the systems stay as is, and the disconnect remains. VN conforms to and supports machines the way it does organizations. Both are purposeful communities™ and any complex of entities is so supported.

Clarification of purpose, redefinition of area, adjustment of authority, these are the continuing actions of an alert, able management. Uncontemplated situations must be recognized and brought to resolution. Otherwise organizations stultify, and bureaucracies bloom.

Until now, computer systems were a clear and justifiable excuse for management. Computer systems stood in the way of management's most fundamental and essential action, in particular, to redefine area, or to adjust authority with respect to any responsibility. Technical analysts designed computer systems for systems purposes. These systems served to confuse and then ensnare the original organizational responsibilities as designed by operating managers.

Managers found their responsibilities had become entangled with an integrated computer system and the system became their master. Each manager was systems constrained, exercised less control in his area of responsibility and was less accountable. Management became mushy, became ensnared by the system. It was the strong management vs. strong systems problem, an example of the very general and very intractable computer systems problem that plagues all computer efforts till this day.

Everywhere multiple application systems began to overlay the once pristinely designed organizational responsibilities. Once committed to computer systems, management realized that their carefully designed responsibilities must be twisted and bent to support, maintain, and comply with, the fixed demands of systems. Since then management has been unable to extricate itself, or its organizational design, from systems entanglements.

VN is different. It allows automation through the power of the stored program machine without entanglements, imposing no artificial systems, conventions, or protocols. VN treats each entity as distinct, separate, independent empowering each to act out its real world actions and behaviors. Thus, VN enlivens the very entities designed by managers, i.e., conceptual persons or responsibilities, and it drives the very entities designed by engineers, i.e., conceptual and physical devices. VN enables the interactions of all the member entities of a purposeful community™, exactly mimicking the behavior and actions of their counterparts, but doing so automatically.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for providing real to virtual correspondence so that premeditated and definable functions performed by a real world entity may be mimicked by a counterpart entity program in a virtual world of machine memory, comprising:
    a memory configured to store virtualized network (VN) adaptation logic, including a virtualized entity (VENT) table, the VN adaptation logic providing a software environment in which a plurality of entity programs are executed, each entity program matching one-to-one to a counterpart, real world entity; and
    a processor configured through the VN adaptation logic to execute instructions to:
        cause the execution of any entity program in the software environment whenever the entity program receives data and action from another entity program, and
        respond to a speak request of a currently executing entity program by passing data and action from the speaking entity program to a listening entity program addressed by the speaking entity program, enabling virtual-to-virtual interactions.

2. The system of claim 1, wherein the real world entities comprise physical persons, physical devices, conceptual persons, and conceptual devices.

3. The system of claim 1, wherein at least one entity program is capable of accepting initial data about a different real world entity, placing the initial data into the VENT table, and specifying an identity, location, and memory space for the different real world entity to create a new entity program.

4. The system of claim 1, wherein at least one entity program is capable of accepting, compiling, and inserting instructions into a memory space of a different entity program to add or change automated procedures that the different entity program performs when execution is transferred to the different entity program.

5. The system of claim 4, wherein entity program instructions are presented in a hierarchy of decision tables, each decision table linking a series of tests to outcomes of the tests and linking the series of tests to resulting actions to be taken based upon the outcomes.

6. The system of claim 5, wherein the hierarchy of the decision tables is interpreted, and the tests and actions executed, by a recursive portion of the VN adaptation logic.

7. The system of claim 1, wherein the VN adaptation logic accomplishes a virtual-to-physical interaction in response to an entity program speak request to transfer data and action to a counterpart, real world entity, by repeated virtual-to-virtual interactions comprising the steps of:
    using the VENT table to identify, reserve, and assemble a series of physically adjacent real world entities forming a channel to transport data and action between the entity programs and the counterpart, real world entities;
    enabling each entity program within the channel to condition its counterpart, real world entity by speaking data and action with conditioning data strings;
    allowing end-to-end communication of data and action to pass through the channel; and
    restoring the VENT table in order to disassemble the channel and release the counterpart, real world entities for other uses.

8. A system, comprising:
    a memory configured to store:
        a first entity program corresponding to a first real world entity, the first entity program comprising first instructions corresponding to predetermined functions performed by the first real world entity, the first instructions permitting the first entity program to automatically mimic the predetermined functions performed by the first real world entity,
        a second entity program corresponding to a second real world entity, the second entity program comprising second instructions corresponding to predetermined functions performed by the second real world entity, the second instructions permitting the second entity program to automatically mimic the predetermined functions performed by the second real world entity, and
        a virtualized entity (VENT) table including a first record corresponding to the first entity program and second record corresponding to the second entity program, the first record comprising a first pointer to the first entity program and the second record comprising a second pointer to the second entity program; and virtualized network (VN) adaptation processing logic configured to:
- locate the first pointer to the first entity program and the second pointer to the second entity program in the VENT table,
- receive first information from the first entity program to be provided to the second entity program based on the located first and second pointers,
- deliver the first information to the second entity program,
- receive second information from the second entity program to be provided to the first entity program based on the located first and second pointers, and deliver the second information to the first entity program.

9. The system of claim 8, wherein:
the first entity program comprises first additional instructions corresponding to first additional functions performed by the first real world entity, the first additional instructions permitting the first entity program to automatically mimic the first additional functions performed by the first real world entity; and
the second entity program comprises second additional instructions corresponding to second additional functions performed by the second real world entity, the second additional instructions permitting the second entity program to automatically mimic the second additional functions performed by the second real world entity.

10. The system of claim 8, wherein the first instructions comprise a hierarchy of decision tables, each decision table linking a series of tests to outcomes of the tests and linking the series of tests to resulting actions to be taken based upon the outcomes.

11. The system of claim 10, wherein the VN adaptation processing logic is further configured to:
interpret the hierarchy of decision tables;
execute the series of tests to determine the resulting actions; and execute the resulting actions.

12. The system of claim 8, wherein the second instructions comprise a hierarchy of decision tables, each decision table linking a series of tests to outcomes of the tests and linking the series of tests to resulting actions to be taken based upon the outcomes.

13. The system of claim 12, wherein the VN adaptation processing logic is further configured to:
interpret the hierarchy of decision tables;
execute the series of tests to determine the resulting actions; and
execute the resulting actions.

14. The system of claim 8, wherein the VN adaptation processing logic is further configured to:
receive a response to the first information from the second entity program based on the second instructions corresponding to predetermined functions performed by the second real world entity; and
receive a response to the second information from the first entity program based on the first instructions corresponding to predetermined functions performed by the first real world entity.

* * * * *